(12) United States Patent
Furtek et al.

(10) Patent No.: US 11,055,103 B2
(45) Date of Patent: *Jul. 6, 2021

(54) METHOD AND APPARATUS FOR A MULTI-CORE SYSTEM FOR IMPLEMENTING STREAM-BASED COMPUTATIONS HAVING INPUTS FROM MULTIPLE STREAMS

(71) Applicant: Cornami, Inc, Sunnyvale, CA (US)

(72) Inventors: Frederick Furtek, Meno Park, CA (US); Paul Master, Sunnyvale, CA (US)

(73) Assignee: Cornami, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/126,918

(22) Filed: Sep. 10, 2018

(65) Prior Publication Data
US 2019/0004813 A1    Jan. 3, 2019

Related U.S. Application Data

(63) Continuation of application No. 14/492,705, filed on Sep. 22, 2014, now Pat. No. 10,073,700, which is a continuation of application No. 13/011,763, filed on Jan. 21, 2011, now Pat. No. 8,843,928.

(60) Provisional application No. 61/297,139, filed on Jan. 21, 2010.

(51) Int. Cl.
| | |
|---|---|
| *G06F 9/46* | (2006.01) |
| *G06F 9/38* | (2018.01) |
| *G06F 9/50* | (2006.01) |
| *G06F 15/173* | (2006.01) |
| *G06F 9/48* | (2006.01) |

(52) U.S. Cl.
CPC .......... *G06F 9/3885* (2013.01); *G06F 9/4881* (2013.01); *G06F 9/505* (2013.01); *G06F 9/5033* (2013.01); *G06F 15/17362* (2013.01)

(58) Field of Classification Search
None
See application file for complete search history.

(56) References Cited

U.S. PATENT DOCUMENTS

| | | | |
|---|---|---|---|
| 3,409,175 A | 11/1968 | Byrne | |
| 3,666,143 A | 5/1972 | Weston | |
| 3,938,639 A | 2/1976 | Birrell | |
| 3,949,903 A | 4/1976 | Benasutti | |
| (Continued) | | | |

FOREIGN PATENT DOCUMENTS

| | | |
|---|---|---|
| EP | 0749597 | 10/2003 |
| JP | 03-102431 | 4/1991 |

*Primary Examiner* — Bing Zhao
(74) *Attorney, Agent, or Firm* — Nixon Peabody LLP

(57) ABSTRACT

A method and system of efficient use and programming of a multi-processing core device. The system includes a programming construct that is based on stream-domain code. A programmable core based computing device is disclosed. The computing device includes a plurality of processing cores coupled to each other. A memory stores stream-domain code including a stream defining a stream destination module and a stream source module. The stream source module places data values in the stream and the stream conveys data values from the stream source module to the stream destination module. A runtime system detects when the data values are available to the stream destination module and schedules the stream destination module for execution on one of the plurality of processing cores.

15 Claims, 11 Drawing Sheets

(56) References Cited

U.S. PATENT DOCUMENTS

| | | |
|---|---|---|
| 3,960,298 A | 6/1976 | Birrell |
| 3,967,062 A | 6/1976 | Dobias |
| 3,991,911 A | 11/1976 | Shannon |
| 3,995,441 A | 12/1976 | McMillin |
| 4,076,145 A | 2/1978 | Zygiel |
| 4,143,793 A | 3/1979 | McMillin |
| 4,172,669 A | 10/1979 | Edelbach |
| 4,174,872 A | 11/1979 | Fessler |
| 4,181,242 A | 1/1980 | Zygiel |
| RE30,301 E | 6/1980 | Zygiel |
| 4,218,014 A | 8/1980 | Tracy |
| 4,222,972 A | 9/1980 | Caldwell |
| 4,237,536 A | 12/1980 | Enelow |
| 4,252,253 A | 2/1981 | Shannon |
| 4,302,775 A | 11/1981 | Widergren |
| 4,333,587 A | 6/1982 | Fessler |
| 4,354,613 A | 10/1982 | Desai |
| 4,377,246 A | 3/1983 | McMillin |
| 4,393,468 A | 7/1983 | New |
| 4,413,752 A | 11/1983 | McMillin |
| 4,458,584 A | 7/1984 | Annese |
| 4,466,342 A | 8/1984 | Basile |
| 4,475,448 A | 10/1984 | Shoaf |
| 4,509,690 A | 4/1985 | Austin |
| 4,520,950 A | 6/1985 | Jeans |
| 4,549,675 A | 10/1985 | Austin |
| 4,553,573 A | 11/1985 | McGarrah |
| 4,560,089 A | 12/1985 | McMillin |
| 4,577,782 A | 3/1986 | Fessler |
| 4,578,799 A | 3/1986 | Scholl |
| RE32,179 E | 6/1986 | Sedam |
| 4,633,386 A | 12/1986 | Terepin |
| 4,649,512 A | 3/1987 | Nukiyama |
| 4,658,988 A | 4/1987 | Hassell |
| 4,694,416 A | 9/1987 | Wheeler |
| 4,711,374 A | 12/1987 | Gaunt |
| 4,713,755 A | 12/1987 | Worley, Jr. |
| 4,719,056 A | 1/1988 | Scott |
| 4,726,494 A | 2/1988 | Scott |
| 4,747,516 A | 5/1988 | Baker |
| 4,748,585 A | 5/1988 | Chiarulli |
| 4,760,525 A | 7/1988 | Webb |
| 4,760,544 A | 7/1988 | Lamb |
| 4,765,513 A | 8/1988 | McMillin |
| 4,766,548 A | 8/1988 | Cedrone |
| 4,781,309 A | 11/1988 | Vogel |
| 4,800,492 A | 1/1989 | Johnson |
| 4,811,214 A | 3/1989 | Nosenchuck |
| 4,824,075 A | 4/1989 | Holzboog |
| 4,827,426 A | 5/1989 | Patton |
| 4,850,269 A | 7/1989 | Hancock |
| 4,856,684 A | 8/1989 | Gerstung |
| 4,901,887 A | 2/1990 | Burton |
| 4,921,315 A | 5/1990 | Metcalfe |
| 4,930,666 A | 6/1990 | Rudick |
| 4,932,564 A | 6/1990 | Austin |
| 4,936,488 A | 6/1990 | Austin |
| 4,937,019 A | 6/1990 | Scott |
| 4,960,261 A | 10/1990 | Scott |
| 4,961,533 A | 10/1990 | Teller |
| 4,967,340 A | 10/1990 | Dawes |
| 4,974,643 A | 12/1990 | Bennett |
| 4,982,876 A | 1/1991 | Scott |
| 4,993,604 A | 2/1991 | Gaunt |
| 5,007,560 A | 4/1991 | Sassak |
| 5,021,947 A | 6/1991 | Campbell |
| 5,040,106 A | 8/1991 | Maag |
| 5,044,171 A | 9/1991 | Farkas |
| 5,090,015 A | 2/1992 | Dabbish |
| 5,129,549 A | 7/1992 | Austin |
| 5,139,708 A | 8/1992 | Scott |
| 5,156,301 A | 10/1992 | Hassell |
| 5,156,871 A | 10/1992 | Goulet |
| 5,165,575 A | 11/1992 | Scott |
| 5,190,083 A | 3/1993 | Gupta |
| 5,190,189 A | 3/1993 | Zimmer |
| 5,193,151 A | 3/1993 | Jain |
| 5,193,718 A | 3/1993 | Hassell |
| 5,202,993 A | 4/1993 | Tarsy |
| 5,203,474 A | 4/1993 | Haynes |
| 5,240,144 A | 8/1993 | Feldman |
| 5,261,099 A | 11/1993 | Bigo |
| 5,263,509 A | 11/1993 | Cherry |
| 5,269,442 A | 12/1993 | Vogel |
| 5,280,711 A | 1/1994 | Motta |
| 5,297,400 A | 3/1994 | Benton |
| 5,301,100 A | 4/1994 | Wagner |
| 5,303,846 A | 4/1994 | Shannon |
| 5,325,525 A | 6/1994 | Shan |
| 5,335,276 A | 8/1994 | Thompson |
| 5,339,428 A | 8/1994 | Burmeister |
| 5,343,716 A | 9/1994 | Swanson |
| 5,361,362 A | 11/1994 | Benkeser |
| 5,367,651 A | 11/1994 | Smith |
| 5,367,687 A | 11/1994 | Tarsy |
| 5,368,198 A | 11/1994 | Goulet |
| 5,379,343 A | 1/1995 | Grube |
| 5,381,546 A | 1/1995 | Servi |
| 5,381,550 A | 1/1995 | Jourdenais |
| 5,388,212 A | 2/1995 | Grube |
| 5,392,960 A | 2/1995 | Kendt |
| 5,428,754 A | 6/1995 | Baldwin |
| 5,437,395 A | 8/1995 | Bull |
| 5,450,557 A | 9/1995 | Kopp |
| 5,454,406 A | 10/1995 | Rejret |
| 5,465,368 A | 11/1995 | Davidson |
| 5,479,055 A | 12/1995 | Eccles |
| 5,490,165 A | 2/1996 | Blakeney, II |
| 5,491,823 A | 2/1996 | Ruttenberg |
| 5,507,009 A | 4/1996 | Grube |
| 5,515,519 A | 5/1996 | Yoshioka |
| 5,517,600 A | 5/1996 | Shimokawa |
| 5,519,694 A | 5/1996 | Brewer |
| 5,522,070 A | 5/1996 | Sumimoto |
| 5,530,964 A | 6/1996 | Alpert |
| 5,534,796 A | 7/1996 | Edwards |
| 5,542,265 A | 8/1996 | Rutland |
| 5,553,755 A | 9/1996 | Bonewald |
| 5,555,417 A | 9/1996 | Odnert |
| 5,560,028 A | 9/1996 | Sachs |
| 5,560,038 A | 9/1996 | Haddock |
| 5,570,587 A | 11/1996 | Kim |
| 5,572,572 A | 11/1996 | Kawan |
| 5,590,353 A | 12/1996 | Sakakibara |
| 5,594,657 A | 1/1997 | Cantone |
| 5,600,810 A | 2/1997 | Ohkami |
| 5,600,844 A | 2/1997 | Shaw |
| 5,602,833 A | 2/1997 | Zehavi |
| 5,603,043 A | 2/1997 | Taylor |
| 5,607,083 A | 3/1997 | Vogel |
| 5,608,643 A | 3/1997 | Wichter |
| 5,611,867 A | 3/1997 | Cooper |
| 5,619,695 A | 4/1997 | Arbabi |
| 5,623,545 A | 4/1997 | Childs |
| 5,625,669 A | 4/1997 | McGregor |
| 5,626,407 A | 5/1997 | Westcott |
| 5,630,206 A | 5/1997 | Urban |
| 5,635,940 A | 6/1997 | Hickman |
| 5,646,544 A | 7/1997 | Iadanza |
| 5,646,545 A | 7/1997 | Trimberger |
| 5,647,512 A | 7/1997 | Assis Mascarenhas de Oliveira |
| 5,667,110 A | 9/1997 | McCann |
| 5,684,793 A | 11/1997 | Kiema |
| 5,684,980 A | 11/1997 | Casselman |
| 5,687,236 A | 11/1997 | Moskowitz |
| 5,694,613 A | 12/1997 | Suzuki |
| 5,694,794 A | 12/1997 | Jerg |
| 5,699,328 A | 12/1997 | Ishizaki |
| 5,701,482 A | 12/1997 | Harrison |
| 5,704,053 A | 12/1997 | Santhanam |
| 5,706,191 A | 1/1998 | Bassett |
| 5,706,976 A | 1/1998 | Purkey |
| 5,712,996 A | 1/1998 | Schepers |
| 5,720,002 A | 2/1998 | Wang |

(56) References Cited

U.S. PATENT DOCUMENTS

| | | |
|---|---|---|
| 5,721,693 A | 2/1998 | Song |
| 5,721,854 A | 2/1998 | Ebicioglu |
| 5,732,563 A | 3/1998 | Bethuy |
| 5,734,808 A | 3/1998 | Takeda |
| 5,737,631 A | 4/1998 | Trimberger |
| 5,742,180 A | 4/1998 | DeHon |
| 5,742,821 A | 4/1998 | Prasanna |
| 5,745,366 A | 4/1998 | Highma |
| RE35,780 E | 5/1998 | Hassell |
| 5,751,295 A | 5/1998 | Becklund |
| 5,754,227 A | 5/1998 | Fukuoka |
| 5,758,261 A | 5/1998 | Weideman |
| 5,768,561 A | 6/1998 | Wise |
| 5,771,362 A | 6/1998 | Bartkowiak |
| 5,778,439 A | 7/1998 | Trimberger |
| 5,784,636 A | 7/1998 | Rupp |
| 5,784,699 A | 7/1998 | McMahon |
| 5,787,237 A | 7/1998 | Reilly |
| 5,790,817 A | 8/1998 | Asghar |
| 5,791,517 A | 8/1998 | Avital |
| 5,791,523 A | 8/1998 | Oh |
| 5,794,062 A | 8/1998 | Baxter |
| 5,794,067 A | 8/1998 | Kadowaki |
| 5,802,055 A | 9/1998 | Krein |
| 5,802,278 A | 9/1998 | Isfeld |
| 5,818,603 A | 10/1998 | Motoyama |
| 5,819,255 A | 10/1998 | Celis |
| 5,822,308 A | 10/1998 | Weigand |
| 5,822,313 A | 10/1998 | Malek |
| 5,822,360 A | 10/1998 | Lee |
| 5,828,858 A | 10/1998 | Athanas |
| 5,829,085 A | 11/1998 | Jerg |
| 5,835,753 A | 11/1998 | Witt |
| 5,838,165 A | 11/1998 | Chatter |
| 5,838,894 A | 11/1998 | Horst |
| 5,845,815 A | 12/1998 | Vogel |
| 5,860,021 A | 1/1999 | Klingman |
| 5,862,961 A | 1/1999 | Motta |
| 5,870,427 A | 2/1999 | Teidemann, Jr. |
| 5,873,045 A | 2/1999 | Lee |
| 5,881,106 A | 3/1999 | Cartier |
| 5,884,284 A | 3/1999 | Peters |
| 5,886,537 A | 3/1999 | Macias |
| 5,887,174 A | 3/1999 | Simons |
| 5,889,816 A | 3/1999 | Agrawal |
| 5,889,989 A | 3/1999 | Robertazzi |
| 5,890,014 A | 3/1999 | Long |
| 5,892,900 A | 4/1999 | Ginter |
| 5,892,961 A | 4/1999 | Trimberger |
| 5,894,473 A | 4/1999 | Dent |
| 5,901,884 A | 5/1999 | Goulet |
| 5,903,886 A | 5/1999 | Heimlich |
| 5,907,285 A | 5/1999 | Toms |
| 5,907,580 A | 5/1999 | Cummings |
| 5,910,733 A | 6/1999 | Bertolet |
| 5,912,572 A | 6/1999 | Graf, III |
| 5,913,172 A | 6/1999 | McCabe |
| 5,917,852 A | 6/1999 | Butterfield |
| 5,920,801 A | 7/1999 | Thomas |
| 5,931,918 A | 8/1999 | Row |
| 5,933,642 A | 8/1999 | Greenbaum |
| 5,940,438 A | 8/1999 | Poon |
| 5,949,415 A | 9/1999 | Lin |
| 5,950,011 A | 9/1999 | Albrecht |
| 5,950,131 A | 9/1999 | Vilmur |
| 5,951,674 A | 9/1999 | Moreno |
| 5,953,322 A | 9/1999 | Kimball |
| 5,956,518 A | 9/1999 | DeHon |
| 5,956,967 A | 9/1999 | Kim |
| 5,959,811 A | 9/1999 | Richardson |
| 5,959,881 A | 9/1999 | Trimberger |
| 5,963,048 A | 10/1999 | Harrison |
| 5,966,534 A | 10/1999 | Cooke |
| 5,970,254 A | 10/1999 | Cooke |
| 5,987,105 A | 11/1999 | Jenkins |
| 5,987,611 A | 11/1999 | Freund |
| 5,991,302 A | 11/1999 | Berl |
| 5,991,308 A | 11/1999 | Fuhrmann |
| 5,993,739 A | 11/1999 | Lyon |
| 5,999,734 A | 12/1999 | Willis |
| 6,005,943 A | 12/1999 | Cohen |
| 6,006,249 A | 12/1999 | Leong |
| 6,016,395 A | 1/2000 | Mohamed |
| 6,018,783 A | 1/2000 | Chiang |
| 6,021,186 A | 2/2000 | Suzuki |
| 6,021,492 A | 2/2000 | May |
| 6,023,742 A | 2/2000 | Ebeling |
| 6,023,755 A | 2/2000 | Casselman |
| 6,028,610 A | 2/2000 | Deering |
| 6,036,166 A | 3/2000 | Olson |
| 6,039,219 A | 3/2000 | Bach |
| 6,041,322 A | 3/2000 | Meng |
| 6,041,970 A | 3/2000 | Vogel |
| 6,046,603 A | 4/2000 | New |
| 6,047,115 A | 4/2000 | Mohan |
| 6,052,600 A | 4/2000 | Fette |
| 6,055,314 A | 4/2000 | Spies |
| 6,056,194 A | 5/2000 | Kolls |
| 6,059,840 A | 5/2000 | Click, Jr. |
| 6,061,580 A | 5/2000 | Altschul |
| 6,073,132 A | 6/2000 | Gehman |
| 6,076,174 A | 6/2000 | Freund |
| 6,078,736 A | 6/2000 | Guccione |
| 6,085,740 A | 7/2000 | Ivri |
| 6,088,043 A | 7/2000 | Kelleher |
| 6,091,263 A | 7/2000 | New |
| 6,091,765 A | 7/2000 | Pietzold, III |
| 6,094,065 A | 7/2000 | Tavana |
| 6,094,726 A | 7/2000 | Gonion |
| 6,111,893 A | 8/2000 | Volftsun |
| 6,111,935 A | 8/2000 | Hughes-Hartogs |
| 6,115,751 A | 9/2000 | Tam |
| 6,120,551 A | 9/2000 | Law |
| 6,122,670 A | 9/2000 | Bennett |
| 6,128,307 A | 10/2000 | Brown |
| 6,134,605 A | 10/2000 | Hudson |
| 6,134,629 A | 10/2000 | L'Ecuyer |
| 6,138,693 A | 10/2000 | Matz |
| 6,141,283 A | 10/2000 | Bogin |
| 6,150,838 A | 11/2000 | Wittig |
| 6,154,492 A | 11/2000 | Araki |
| 6,154,494 A | 11/2000 | Sugahara |
| 6,157,997 A | 12/2000 | Oowaki |
| 6,175,854 B1 | 1/2001 | Bretscher |
| 6,175,892 B1 | 1/2001 | Sazzad |
| 6,181,981 B1 | 1/2001 | Varga |
| 6,185,418 B1 | 2/2001 | MacLellan |
| 6,192,070 B1 | 2/2001 | Poon |
| 6,192,255 B1 | 2/2001 | Lewis |
| 6,192,388 B1 | 2/2001 | Cajolet |
| 6,195,788 B1 | 2/2001 | Leaver |
| 6,198,924 B1 | 3/2001 | Ishii |
| 6,199,093 B1 | 3/2001 | Yokoya |
| 6,199,181 B1 | 3/2001 | Rechef |
| 6,202,130 B1 | 3/2001 | Scales, III |
| 6,219,697 B1 | 4/2001 | Lawande |
| 6,219,756 B1 | 4/2001 | Kasamizugami |
| 6,219,780 B1 | 4/2001 | Lipasti |
| 6,223,222 B1 | 4/2001 | Fijolek |
| 6,226,387 B1 | 5/2001 | Tewfik |
| 6,230,307 B1 | 5/2001 | Davis |
| 6,237,029 B1 | 5/2001 | Master |
| 6,246,883 B1 | 6/2001 | Lee |
| 6,247,125 B1 | 6/2001 | Noel-Baron |
| 6,249,251 B1 | 6/2001 | Chang |
| 6,258,725 B1 | 7/2001 | Lee |
| 6,263,057 B1 | 7/2001 | Silverman |
| 6,266,760 B1 | 7/2001 | DeHon |
| 6,272,579 B1 | 8/2001 | Lentz |
| 6,281,703 B1 | 8/2001 | Furuta |
| 6,282,627 B1 | 8/2001 | Wong |
| 6,289,375 B1 | 9/2001 | Knight |
| 6,289,434 B1 | 9/2001 | Roy |
| 6,289,488 B1 | 9/2001 | Dave |

(56) References Cited

U.S. PATENT DOCUMENTS

| | | |
|---|---|---|
| 6,292,822 B1 | 9/2001 | Hardwick |
| 6,292,827 B1 | 9/2001 | Raz |
| 6,292,830 B1 | 9/2001 | Taylor |
| 6,301,653 B1 | 10/2001 | Mohamed |
| 6,305,014 B1 | 10/2001 | Roediger |
| 6,311,149 B1 | 10/2001 | Ryan |
| 6,321,985 B1 | 11/2001 | Kolls |
| 6,346,824 B1 | 2/2002 | New |
| 6,347,346 B1 | 2/2002 | Taylor |
| 6,349,394 B1 | 2/2002 | Brock |
| 6,353,841 B1 | 3/2002 | Marshall |
| 6,356,863 B1 | 3/2002 | Sayle |
| 6,356,994 B1 | 3/2002 | Barry |
| 6,359,248 B1 | 3/2002 | Mardi |
| 6,360,256 B1 | 3/2002 | Lim |
| 6,360,259 B1 | 3/2002 | Bradley |
| 6,360,263 B1 | 3/2002 | Kurtzberg |
| 6,363,411 B1 | 3/2002 | Dugan |
| 6,366,999 B1 | 4/2002 | Drabenstott |
| 6,377,983 B1 | 4/2002 | Cohen |
| 6,378,072 B1 | 4/2002 | Collins |
| 6,381,735 B1 | 4/2002 | Hunt |
| 6,385,751 B1 | 5/2002 | Wolf |
| 6,405,214 B1 | 6/2002 | Meade, II |
| 6,408,039 B1 | 6/2002 | Ito |
| 6,410,941 B1 | 6/2002 | Taylor |
| 6,411,612 B1 | 6/2002 | Halford |
| 6,421,372 B1 | 7/2002 | Bierly |
| 6,421,809 B1 | 7/2002 | Wuytack |
| 6,430,624 B1 | 8/2002 | Jamtgaard |
| 6,433,578 B1 | 8/2002 | Wasson |
| 6,434,590 B1 | 8/2002 | Blelloch |
| 6,438,737 B1 | 8/2002 | Morelli |
| 6,446,258 B1 | 9/2002 | McKinsey |
| 6,449,747 B2 | 9/2002 | Wuytack |
| 6,456,996 B1 | 9/2002 | Crawford, Jr. |
| 6,459,883 B2 | 10/2002 | Subramanian |
| 6,467,009 B1 | 10/2002 | Winegarden |
| 6,473,609 B1 | 10/2002 | Schwartz |
| 6,507,947 B1 | 1/2003 | Schreiber |
| 6,510,138 B1 | 1/2003 | Pannell |
| 6,510,510 B1 | 1/2003 | Garde |
| 6,538,470 B1 | 3/2003 | Langhammer |
| 6,556,044 B2 | 4/2003 | Langhammer |
| 6,563,891 B1 | 5/2003 | Eriksson |
| 6,570,877 B1 | 5/2003 | Kloth |
| 6,577,678 B2 | 6/2003 | Scheuermann |
| 6,587,684 B1 | 7/2003 | Hsu |
| 6,590,415 B2 | 7/2003 | Agrawal |
| 6,601,086 B1 | 7/2003 | Howard |
| 6,601,158 B1 | 7/2003 | Abbott |
| 6,604,085 B1 | 8/2003 | Kolls |
| 6,604,189 B1 | 8/2003 | Zemlyak |
| 6,606,529 B1 | 8/2003 | Crowder, Jr. |
| 6,611,908 B2 | 8/2003 | McAllister |
| 6,615,333 B1 | 9/2003 | Hoogerbrugge |
| 6,618,434 B2 | 9/2003 | Heidari-Bateni |
| 6,618,777 B1 | 9/2003 | Greenfield |
| 6,640,304 B2 | 10/2003 | Ginter |
| 6,647,429 B1 | 11/2003 | Semal |
| 6,653,859 B2 | 11/2003 | Sihlbom |
| 6,675,265 B2 | 1/2004 | Barroso |
| 6,684,319 B1 | 1/2004 | Mohamed |
| 6,691,148 B1 | 2/2004 | Zinky |
| 6,711,607 B1 | 3/2004 | Goyal |
| 6,711,617 B1 | 3/2004 | Bantz |
| 6,718,182 B1 | 4/2004 | Kung |
| 6,718,541 B2 | 4/2004 | Ostanevich |
| 6,721,286 B1 | 4/2004 | Williams |
| 6,721,884 B1 | 4/2004 | De Oliveira Kastrup Pereira |
| 6,732,354 B2 | 5/2004 | Ebeling |
| 6,735,621 B1 | 5/2004 | Yoakum |
| 6,738,744 B2 | 5/2004 | Kirovski |
| 6,748,360 B2 | 6/2004 | Pitman |
| 6,754,470 B2 | 6/2004 | Hendrickson |
| 6,760,587 B2 | 7/2004 | Holtzman |
| 6,760,833 B1 | 7/2004 | Dowling |
| 6,766,165 B2 | 7/2004 | Sharma |
| 6,778,212 B1 | 8/2004 | Deng |
| 6,785,341 B2 | 8/2004 | Walton |
| 6,807,590 B1 | 10/2004 | Carlson |
| 6,819,140 B2 | 11/2004 | Yamanaka |
| 6,823,448 B2 | 11/2004 | Roth |
| 6,829,633 B2 | 12/2004 | Gelfer |
| 6,832,250 B1 | 12/2004 | Coons |
| 6,836,839 B2 | 12/2004 | Master |
| 6,865,664 B2 | 3/2005 | Budrovic |
| 6,871,236 B2 | 3/2005 | Fishman |
| 6,883,074 B2 | 4/2005 | Lee |
| 6,883,084 B1 | 4/2005 | Donohoe |
| 6,894,996 B2 | 5/2005 | Lee |
| 6,901,440 B1 | 5/2005 | Bimm |
| 6,907,598 B2 | 6/2005 | Fraser |
| 6,912,515 B2 | 6/2005 | Jackson |
| 6,983,460 B1 | 1/2006 | Goire |
| 6,985,517 B2 | 1/2006 | Matsumoto |
| 6,986,021 B2 | 1/2006 | Master |
| 6,988,139 B1 | 1/2006 | Jervis |
| 7,032,229 B1 | 4/2006 | Flores |
| 7,044,741 B2 | 5/2006 | Leem |
| 7,082,456 B2 | 7/2006 | Mani-Meitav |
| 7,139,910 B1 | 11/2006 | Ainsworth |
| 7,142,731 B1 | 11/2006 | Toi |
| 7,243,333 B2 | 7/2007 | Gschwind |
| 7,249,242 B2 | 7/2007 | Ramchandran |
| 7,503,048 B1 | 3/2009 | Sheets |
| 7,620,678 B1 | 11/2009 | Master |
| 8,108,845 B2 | 1/2012 | Little |
| 8,214,808 B2 | 7/2012 | Day |
| 8,601,458 B2 | 12/2013 | Andrade |
| 8,621,446 B2 | 12/2013 | Archer |
| 8,645,934 B2 | 2/2014 | Fontenot |
| 2001/0003191 A1 | 6/2001 | Kovacs |
| 2001/0023482 A1 | 9/2001 | Wray |
| 2001/0029515 A1 | 10/2001 | Mirsky |
| 2001/0034795 A1 | 10/2001 | Moulton |
| 2001/0039654 A1 | 11/2001 | Miyamoto |
| 2001/0048713 A1 | 12/2001 | Medlock |
| 2001/0048714 A1 | 12/2001 | Jha |
| 2001/0050948 A1 | 12/2001 | Ramberg |
| 2002/0010848 A1 | 1/2002 | Kamano |
| 2002/0013799 A1 | 1/2002 | Blaker |
| 2002/0013937 A1 | 1/2002 | Ostanevich |
| 2002/0015435 A1 | 2/2002 | Rieken |
| 2002/0015439 A1 | 2/2002 | Kohli |
| 2002/0023210 A1 | 2/2002 | Tuomenoksa |
| 2002/0024942 A1 | 2/2002 | Tsuneki |
| 2002/0024993 A1 | 2/2002 | Subramanian |
| 2002/0031166 A1 | 3/2002 | Subramanian |
| 2002/0032551 A1 | 3/2002 | Zakiya |
| 2002/0035623 A1 | 3/2002 | Lawande |
| 2002/0041581 A1 | 4/2002 | Aramaki |
| 2002/0042907 A1 | 4/2002 | Yamanaka |
| 2002/0046400 A1 | 4/2002 | Burch |
| 2002/0061741 A1 | 5/2002 | Leung |
| 2002/0069282 A1 | 6/2002 | Reisman |
| 2002/0072830 A1 | 6/2002 | Hunt |
| 2002/0078337 A1 | 6/2002 | Moreau |
| 2002/0083305 A1 | 6/2002 | Renard |
| 2002/0083423 A1 | 6/2002 | Ostanevich |
| 2002/0087829 A1 | 7/2002 | Snyder |
| 2002/0089348 A1 | 7/2002 | Langhammer |
| 2002/0101909 A1 | 8/2002 | Chen |
| 2002/0107905 A1 | 8/2002 | Roe |
| 2002/0107962 A1 | 8/2002 | Richter |
| 2002/0119803 A1 | 8/2002 | Bitterlich |
| 2002/0120672 A1 | 8/2002 | Butt |
| 2002/0138716 A1 | 9/2002 | Master |
| 2002/0141489 A1 | 10/2002 | Imaizumi |
| 2002/0147845 A1 | 10/2002 | Sanchez-Herrero |
| 2002/0159503 A1 | 10/2002 | Ramachandran |
| 2002/0162026 A1 | 10/2002 | Neuman |
| 2002/0168018 A1 | 11/2002 | Scheuermann |
| 2002/0181559 A1 | 12/2002 | Heidari-Bateni |

(56) References Cited

U.S. PATENT DOCUMENTS

| | | |
|---|---|---|
| 2002/0184291 A1 | 12/2002 | Hogenauer |
| 2002/0184498 A1 | 12/2002 | Qi |
| 2002/0191790 A1 | 12/2002 | Anand |
| 2003/0007606 A1 | 1/2003 | Suder |
| 2003/0012270 A1 | 1/2003 | Zhou |
| 2003/0018446 A1 | 1/2003 | Makowski |
| 2003/0018700 A1 | 1/2003 | Giroti |
| 2003/0023830 A1 | 1/2003 | Hogenauer |
| 2003/0026242 A1 | 2/2003 | Jokinen |
| 2003/0030004 A1 | 2/2003 | Dixon |
| 2003/0046421 A1 | 3/2003 | Horvitz |
| 2003/0061260 A1 | 3/2003 | Rajkumar |
| 2003/0061311 A1 | 3/2003 | Lo |
| 2003/0063656 A1 | 4/2003 | Rao |
| 2003/0076815 A1 | 4/2003 | Miller |
| 2003/0088755 A1 | 5/2003 | Gudmunson |
| 2003/0099223 A1 | 5/2003 | Chang |
| 2003/0102889 A1 | 6/2003 | Master |
| 2003/0105949 A1 | 6/2003 | Master |
| 2003/0110485 A1 | 6/2003 | Lu |
| 2003/0131162 A1 | 7/2003 | Secatch |
| 2003/0142818 A1 | 7/2003 | Raghunathan |
| 2003/0154357 A1 | 8/2003 | Master |
| 2003/0163723 A1 | 8/2003 | Kozuch |
| 2003/0172138 A1 | 9/2003 | McCormack |
| 2003/0172139 A1 | 9/2003 | Srinivasan |
| 2003/0200538 A1 | 10/2003 | Ebeling |
| 2003/0212684 A1 | 11/2003 | Meyer |
| 2004/0006584 A1 | 1/2004 | Vandeweerd |
| 2004/0010645 A1 | 1/2004 | Scheuermann |
| 2004/0015970 A1 | 1/2004 | Scheuermann |
| 2004/0015973 A1 | 1/2004 | Skovira |
| 2004/0025159 A1 | 2/2004 | Scheuermann |
| 2004/0057505 A1 | 3/2004 | Valio |
| 2004/0062300 A1 | 4/2004 | McDonough |
| 2004/0081248 A1 | 4/2004 | Parolari |
| 2004/0083462 A1 | 4/2004 | Gschwind |
| 2004/0093479 A1 | 5/2004 | Ramchandran |
| 2004/0133745 A1 | 7/2004 | Ramchandran |
| 2004/0168044 A1 | 8/2004 | Ramchandran |
| 2004/0181786 A1 | 9/2004 | Allison |
| 2005/0038984 A1 | 2/2005 | Heidari-Bateni |
| 2005/0044327 A1 | 2/2005 | Howard |
| 2005/0044344 A1 | 2/2005 | Stevens |
| 2005/0166033 A1 | 7/2005 | Jacob |
| 2005/0166038 A1 | 7/2005 | Wang |
| 2005/0166073 A1 | 7/2005 | Lee |
| 2005/0183091 A1 | 8/2005 | Van Eijndhoven |
| 2005/0198199 A1 | 9/2005 | Dowling |
| 2006/0031660 A1 | 2/2006 | Master |
| 2006/0150165 A1 | 7/2006 | Hooper |
| 2006/0174234 A1 | 8/2006 | Arenburg |
| 2007/0038987 A1 | 2/2007 | O'hara |
| 2007/0157166 A1 | 7/2007 | Stevens |
| 2007/0169027 A1 | 7/2007 | Drepper |
| 2007/0294512 A1 | 12/2007 | Crutchfield |
| 2007/0294696 A1 | 12/2007 | Papakipos |
| 2008/0134158 A1 | 6/2008 | Salz |
| 2008/0301694 A1 | 12/2008 | Mattson |
| 2009/0282408 A1 | 11/2009 | Joffe |
| 2009/0300615 A1 | 12/2009 | Andrade |
| 2010/0312801 A1 | 12/2010 | Ostrovsky |
| 2011/0131558 A1 | 6/2011 | Young |
| 2011/0271263 A1 | 11/2011 | Archer |
| 2011/0296423 A1 | 12/2011 | Elnozahy |

ELEMENTS OF THE ACM NODAL ARCHITECTURE

METHOD AND APPARATUS FOR A MULTI-CORE SYSTEM FOR IMPLEMENTING STREAM-BASED COMPUTATIONS HAVING INPUTS FROM MULTIPLE STREAMS

CROSS-REFERENCE TO RELATED APPLICATIONS

This application is a continuation application of Ser. No. 14/492,705, filed on Sep. 22, 2014; U.S. application Ser. No. 14/492,705 is a continuation of U. S. application Ser. No. 13/011,763 filed on Jan. 21, 2011, all of which claim priority to Provisional Application Ser. No. 61/297,139 filed Jan. 21, 2010. This application is related to U.S. patent application Ser. No. 09/815,122, filed on Mar. 22, 2001, now U.S. Pat. No. 6,836,839 entitled "ADAPTIVE INTEGRATED CIRCUITRY WITH HETEROGENEOUS AND RECONFIGURABLE MATRICES OF DIVERSE AND ADAPTIVE COMPUTATIONAL UNITS HAVING FIXED, APPLICATION SPECIFIC COMPUTATIONAL ELEMENTS"; U.S. patent application Ser. No. 10/384,486, now U.S. Pat. No. 7,325,123 entitled HIERARCHICAL INTERCONNECT FOR CONFIGURING SEPARATE INTERCONNECTS FOR EACH GROUP OF FIXED AND DIVERSE COMPUTATIONAL ELEMENTS"; and U.S. patent application Ser. No. 10/443,501, now U.S. Pat. No. 7,609,297 entitled "HARDWARE TASK MANAGER." All of these applications are hereby incorporated by reference.

TECHNICAL FIELD

This invention relates in general to programming multiple processor systems and more specifically to a hardware task manager that efficiently utilizes parallel programming constructs incorporating both streams and threads.

BACKGROUND

A common limitation to processing performance in a digital system is the efficiency and speed of transferring instruction, data and other information among different components and subsystems within the digital system. For example, the bus speed in a general-purpose Von Neumann architecture dictates how fast data can be transferred between the processor and memory and, as a result, places a limit on the computing performance (e.g., million instructions per second (MIPS), floating-point operations per second (FLOPS), etc.).

Other types of computer architecture design, such as multi-processor or parallel processor designs require complex communication, or interconnection, capabilities so that each of the different processors can communicate with other processors, with multiple memory devices, input/output (I/O) ports, etc. With today's complex processor system designs, the importance of an efficient and fast interconnection facility rises dramatically. However, such facilities are difficult to design to optimize goals of speed, flexibility and simplicity of design.

Currently, parallel programming is based on threads as the central, organizing principle of computing. However, threads are seriously flawed as a computation model because they are wildly nondeterministic and rely on programming style to constrain that non-determinism to achieve deterministic aims. Test and verification become difficult in the presence of this wild non-determinism. One solution has been suggested by GPU (Graphics Processing Unit) vendors is to narrow the forms of parallelism expressible in the programming model. Their focus on data parallelism, however, ties the hands of programmers and prevents exploiting the full potential of multi-core processors.

Further, threads do not just run on a bank of identical cores. A modern computer (supercomputer, workstation, desktop and laptops) contains a bewildering array of different heterogeneous cores all requiring separate programming models to program. For example, a motherboard may have one to four main CPUs (central processing units e.g., Pentium Processor) each having on-die 1 to 6 CPU cores with an on-die or on-package GPU (Graphics Processing Unit—e.g. NVIDIA GPU) which itself contains 16 to 256 GPU cores along with several discrete video & audio encode & decode cores (for the encoding and decoding of a multiplicity of video standards—e.g. MPEG2, MPEG4, VC-1, H.264 etc.). Also on the motherboard are from 1 to 4 discrete high end GPUs each containing 16 to 1024 GPU cores along with several discrete high-end configurable (meaning the core can be selected to encode/decode a variety of pre-existing standards) video/audio encode & decode cores (for the encoding and decoding of a multiplicity of video standards—e.g. MPEG2, MPEG4, VC-1, H.264 etc., at very high resolutions and with multiple channels of sound). Additional subsystems composed of processing cores are added to the motherboard in the form of communications cores (e.g. TCP/IP offload cores which themselves are typical built from one or more CPU cores and one or more packet processing cores. WiFi cores, Blue Tooth cores, WiMax cores, 3G cores, 4G cores which are from one or more CPU cores and one or more broadband/baseband processing cores).

Current high end of the spectrum devices such as supercomputers add an additional processor in the form of one to four FPGAs (field programmable gate array) per motherboard. Each FPGA is itself composed of hundreds of thousand to tens of millions of very simplistic CLB processing cores along with multiple hard IP or Soft IP CPU core and multiple DSP cores). Then these motherboards themselves are then replicated and interconnected in the hundreds to thousands to produce a modern supercomputer. These systems (either the desktops/workstations/laptops and/or the supercomputers) and then interconnected via the Internet to provide national and global computing capabilities.

The complexity of "managing" and "programming" such a diverse series of cores is a severe problem. Most programmers do not even attempt this and just settle for programming just one CPU core ignoring the rest of the cores. There are a certain number of algorithms know in the industry as "embarrassingly parallel problems" (e.g. the Google Search algorithm for example is simple to spread across multiple CPUs due to the fact that there is very little to no interactivity across the parallel threads). Unfortunately the vast majority of problems do not have these characteristics, they require a high degree of interactivity and synchronization across the multiple threads.

It would therefore be desirable to incorporate multithreading, unrestricted parallelism and deterministic behavior such as in modern programming language streams. Streams date at least to the introduction of the C programming language in 1978, and have been incorporated into such languages as C++, Java, Visual Basic and F#. However, in these languages, streams are relegated to a rather narrow role of providing a framework for I/O and file access. It is therefore desirable to expand the role of streams in parallel programming to first-class objects, a status roughly comparable to that of variables.

SUMMARY

According to one example, a programmable core based computing device is disclosed. The computing device includes a plurality of processing cores coupled to each other. A memory stores stream-domain code including a stream defining a stream destination module and a stream source module. The stream source module places data values in the stream and the stream conveys data values from the stream source module to the stream destination module. A runtime system detects when the data values are available to the stream destination module and schedules the stream destination module for execution on one of the plurality of processing cores.

Additional aspects of the invention will be apparent to those of ordinary skill in the art in view of the detailed description of various embodiments, which is made with reference to the drawings, a brief description of which is provided below.

DETAILED DESCRIPTION OF THE PREFERRED EMBODIMENT

Adaptive Computing Engine and Adaptive Computing Machine

Figure 1:
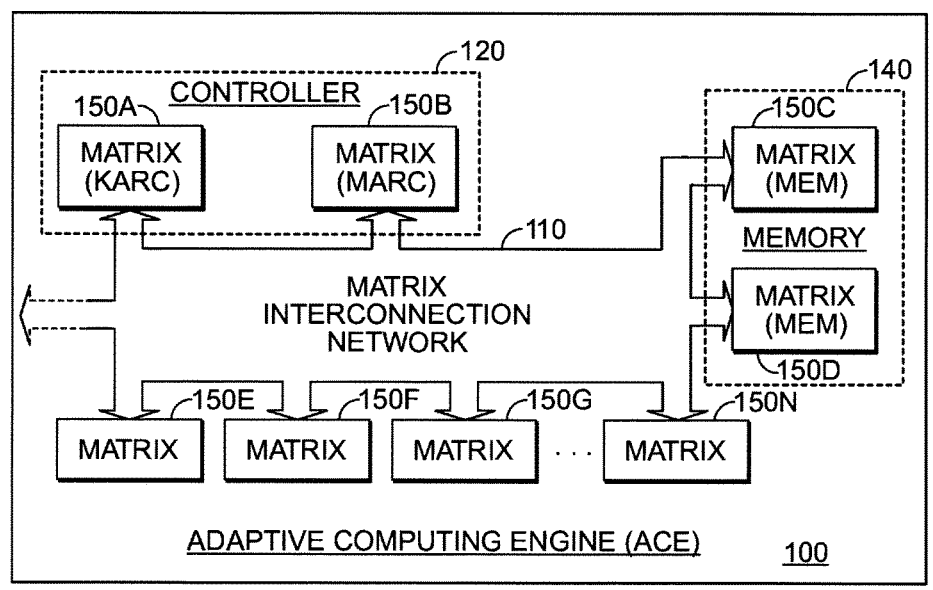
FIG. 1 shows an overview of an adaptable computing engine compatible with a disclosed stream based programming model.

FIG. 1 is a block diagram illustrating an example of a multi-processor system using an example computational model. Apparatus 100, referred to herein as an adaptive computing engine (ACE) 100, is preferably embodied as an integrated circuit, or as a portion of an integrated circuit having other, additional components. In the exemplary embodiment, and as discussed in greater detail below, the ACE 100 includes one or more reconfigurable matrices (or nodes) 150, such as matrices 150A through 150N as illustrated, and a matrix interconnection network 110. Also in the exemplary embodiment, and as discussed in detail below, one or more of the matrices 150, such as matrices 150A and 150B, are configured for functionality as a controller 120, while other matrices, such as matrices 150C and 150D, are configured for functionality as a memory 140. The various matrices 150 and matrix interconnection network 110 may also be implemented together as fractal subunits, which may be scaled from a few nodes to thousands of nodes.

In a preferred embodiment, the ACE 100 does not utilize traditional (and typically separate) data, DMA, random access, configuration and instruction busses for signaling and other transmission between and among the reconfigurable matrices 150, the controller 120, and the memory 140, or for other input/output ("I/O") functionality. Rather, data, control and configuration information are transmitted between and among these matrix 150 elements, utilizing the matrix interconnection network 110, which may be configured and reconfigured, in real-time, to provide any given connection between and among the reconfigurable matrices 150, including those matrices 150 configured as the controller 120 and the memory 140.

The matrices 150 configured to function as memory 140 may be implemented in any desired or exemplary way, utilizing computational elements (discussed below) of fixed memory elements, and may be included within the ACE 100 or incorporated within another IC or portion of an IC. In the exemplary embodiment, the memory 140 is included within the ACE 100, and preferably is comprised of computational elements which are low power consumption random access memory (RAM), but also may be comprised of computational elements of any other form of memory, such as flash, DRAM, SRAM, MRAM, ROM, EPROM or E2PROM. In the exemplary embodiment, the memory 140 preferably includes direct memory access (DMA) engines, not separately illustrated.

The controller 120 is preferably implemented, using matrices 150A and 150B configured as adaptive finite state machines (FSMs), as a reduced instruction set ("RISC") processor, controller or other device or IC capable of performing the two types of functionality discussed below. Alternatively, these functions may be implemented utilizing a conventional RISC or other processor. The first control functionality, referred to as "kernel" control, is illustrated as kernel controller ("KARC") of matrix 150A, and the second control functionality, referred to as "matrix" control, is illustrated as matrix controller ("MARC") of matrix 150B. The kernel and matrix control functions of the controller 120 are explained in greater detail below, with reference to the configurability and reconfigurability of the various matrices 150, and with reference to the exemplary form of combined data, configuration and control information referred to herein as a "silverware" module.

The matrix interconnection network 110 of FIG. 1, includes subset interconnection networks (not shown). These can include a boolean interconnection network, data interconnection network, and other networks or interconnection schemes collectively and generally referred to herein as "interconnect," "interconnection(s)" or "interconnection network(s)," or "networks," and may be implemented generally as known in the art, such as utilizing FPGA interconnection networks or switching fabrics, albeit in a considerably more varied fashion. In the exemplary embodiment, the various interconnection networks are implemented as described, for example, in U.S. Pat. No. 5,218,240, U.S. Pat. No. 5,336,950, U.S. Pat. No. 5,245,227, and U.S. Pat. No. 5,144,166. These various interconnection networks provide selectable (or switchable) connections between and among the controller 120, the memory 140, the various matrices 150, and the computational units (or "nodes") and computational elements, providing the physical basis for the configuration and reconfiguration referred to herein, in response to and under the control of configuration signaling generally referred to herein as "configuration information." In addition, the various interconnection networks (110, 210, 240 and 220) provide selectable or switchable data, input, output, control and configuration paths, between and among the controller 120, the memory 140, the various matrices 150, and the computational units, components and elements, in lieu of any form of traditional or separate input/output busses, data busses, DMA, RAM, configuration and instruction busses.

It should be pointed out, however, that while any given switching or selecting operation of, or within, the various interconnection networks may be implemented as known in the art, the design and layout of the various interconnection networks, in accordance with the present invention, are new and novel, as discussed in greater detail below. For example, varying levels of interconnection are provided to correspond to the varying levels of the matrices, computational units, and elements. At the matrix 150 level, in comparison with the prior art FPGA interconnect, the matrix interconnection network 110 is considerably more limited and less "rich," with lesser connection capability in a given area, to reduce capacitance and increase speed of operation. Within a particular matrix or computational unit, however, the interconnection network may be considerably more dense and rich, to provide greater adaptation and reconfiguration capability within a narrow or close locality of reference.

The various matrices or nodes 150 are reconfigurable and heterogeneous, namely, in general, and depending upon the desired configuration: reconfigurable matrix 150A is generally different from reconfigurable matrices 150B through 150N; reconfigurable matrix 150B is generally different from reconfigurable matrices 150A and 150C through 150N; reconfigurable matrix 150C is generally different from reconfigurable matrices 150A, 150B and 150D through 150N, and so on. The various reconfigurable matrices 150 each generally contain a different or varied mix of adaptive and reconfigurable nodes, or computational units; the nodes, in turn, generally contain a different or varied mix of fixed, application specific computational components and elements that may be adaptively connected, configured and reconfigured in various ways to perform varied functions, through the various interconnection networks. In addition to varied internal configurations and reconfigurations, the various matrices 150 may be connected, configured and reconfigured at a higher level, with respect to each of the other matrices 150, through the matrix interconnection network 110. Details of the ACE architecture can be found in the related patent applications, referenced above.

Figure 2:
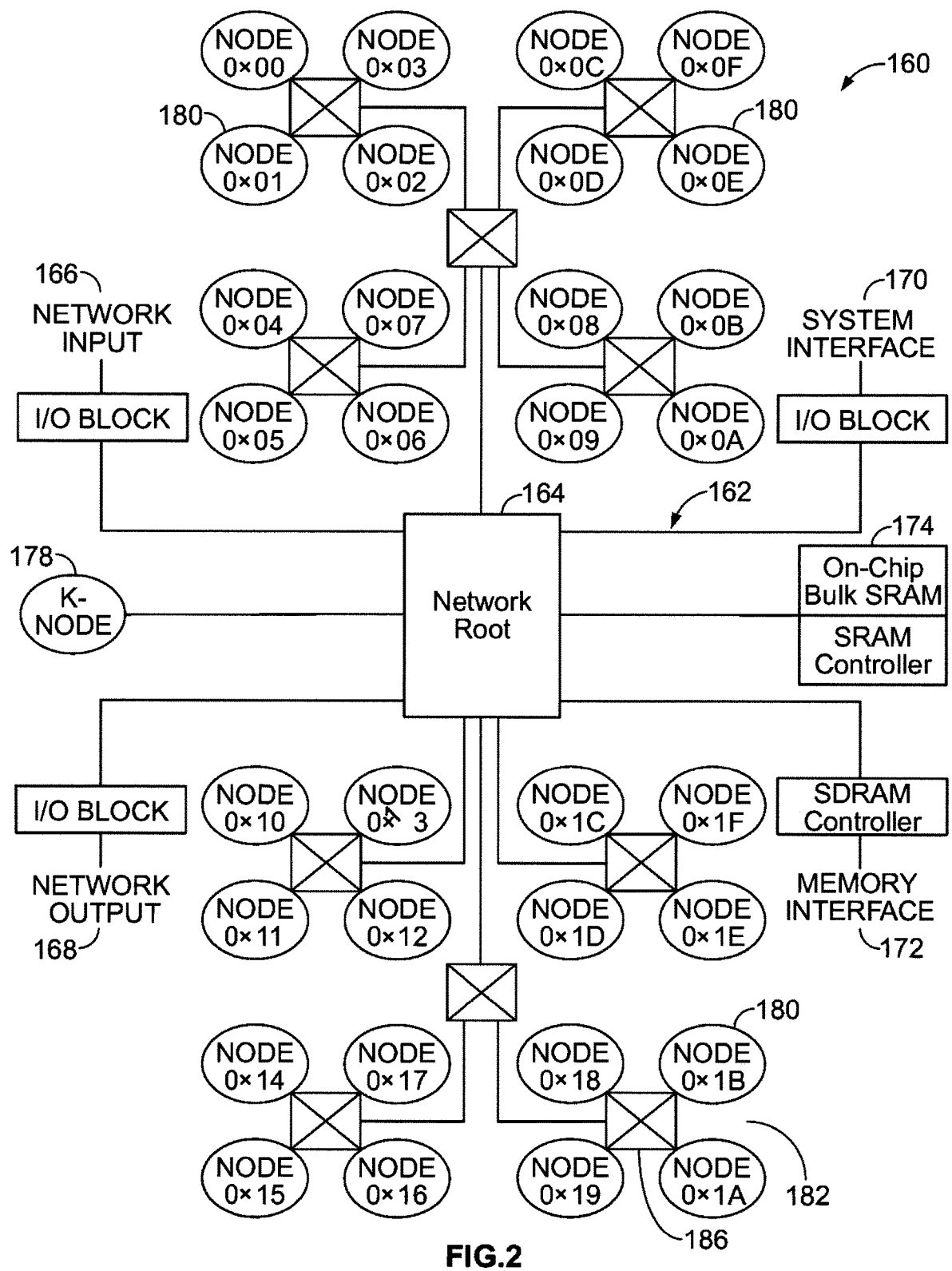
FIG. 2 illustrates a block diagram of an adaptive computing machine compatible with the programming model.

Another example of an adaptive computing machine 160 that may use the parallel computational model is shown in FIG. 2. The adaptive computing machine 160 in this example has thirty-two heterogeneous leaf nodes 180 that are coupled together via a network 162. The network 162 has a single root 164 that is coupled to a group of network input ports 166, a group of network output ports 168, an optional system interface port 170, an external memory interface 172 and an internal memory interface 174. A supervisor node or K-node 178 is also coupled to the root 164.

The nodes 180 are each grouped in a quadtrees such as the quadtree 182. The quadtrees such as the quadtree 182 are implemented using 5-ported switch elements 184, each connected to a single parent and up to four children nodes 180. The switch elements implement a fair, round-robin arbitration scheme and provide pipelining with multi-level look-ahead for enhanced performance. In this example, the width of all paths is constant (51 bits), but the option is available to widen pathways as a tree is ascended, in the style of Leiserson's fat trees, in order to increase network bandwidth.

Figure 3:
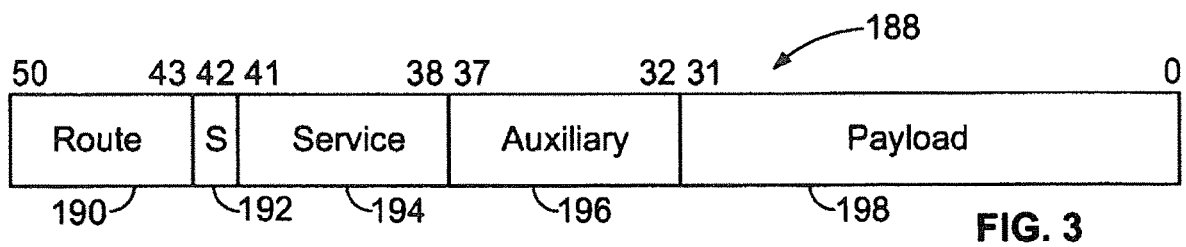
FIG. 3 is a diagram of a network word in the network of the adaptive computing machine in FIG. 2.

In this example all traffic on the network 162 is in the form of 51-bit network words as shown in the network word 188 shown in FIG. 3. The network word 188 has a route field 190, a security bit 192, a service field 194, an auxiliary field 196 and a payload field 198. The route field 190 is the destination address of the network word 188. The two high-order bits in the route field 190 are the chip ID. The security bit 192 allows peeks (reads) and pokes (writes) to configuration memory. The security bit 192 is set only for words sent by the K-Node 178. The service field 194 defines the type of service and the auxiliary field 196 is dependent on the service type. The service field 194 defines one of sixteen service types including Point-to-Point (PTP) which relates to streaming data and PTP acknowledgement which supports flow control for PTP data and causes a Consumer or Producer Count at the destination node to be incremented or decremented.

Node Wrapper

Figure 4:
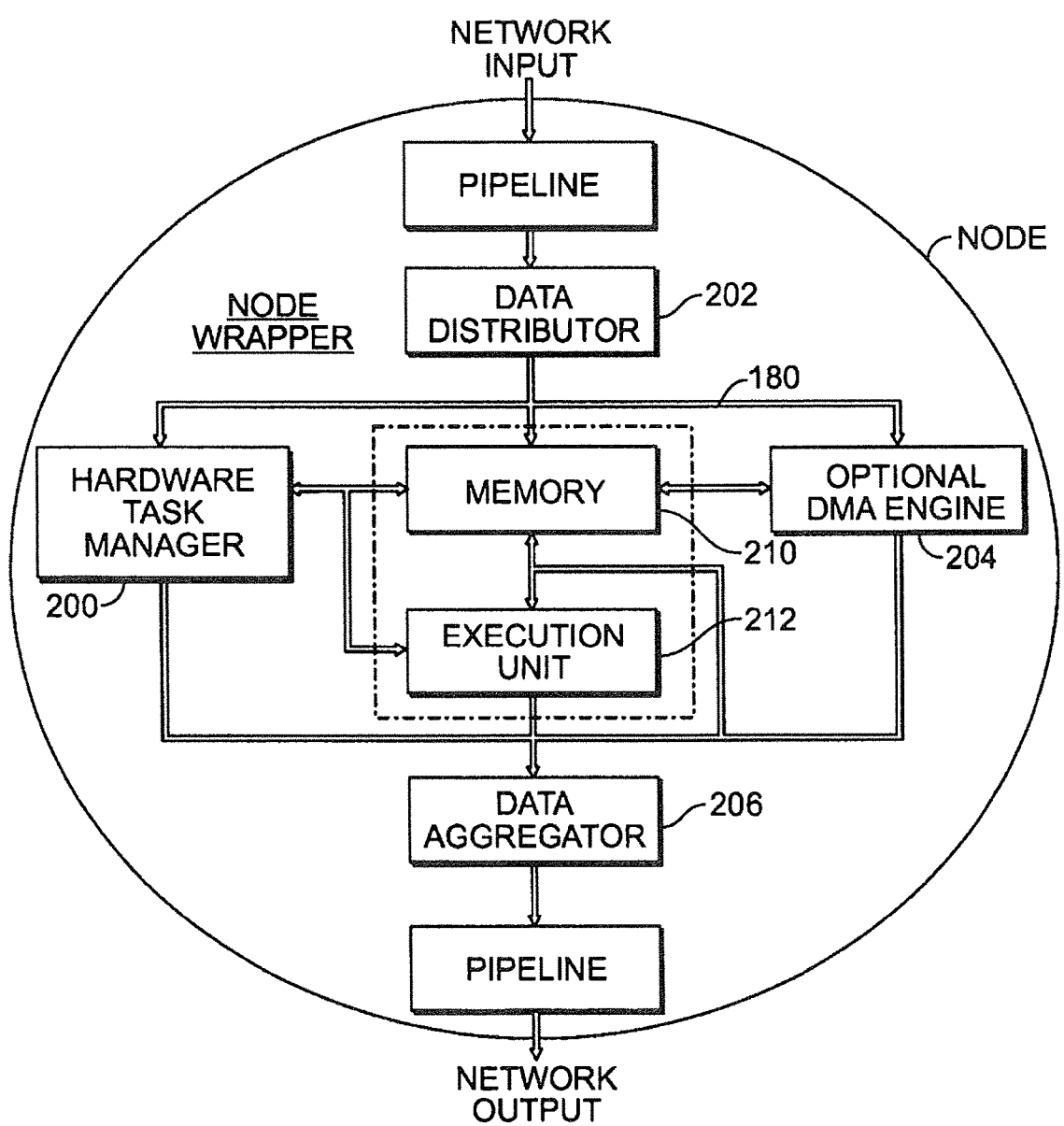
FIG. 4 illustrates the node wrapper interface between heterogeneous nodes and the homogenous network in the ACE architecture in FIG. 1 or ACM architecture in FIG. 2.

FIG. 4 illustrates the interface between heterogeneous nodes and the homogenous network in the ACE architecture in FIG. 1 or the ACM architecture in FIG. 2. This interface is referred to as a "node wrapper" since it is used to provide a common input and output mechanism for each node. A node's execution units and memory are interfaced with the network and with control software via the node wrapper to provide a uniform, consistent system-level programming model. In this example, the node 180 includes a memory 210 and an execution unit 212. Details of the node wrapper can be found in the related patent applications referenced, above.

In a preferred embodiment, each node wrapper includes a hardware task manager (HTM) 200. Node wrappers also include data distributor 202, optional direct memory access (DMA) engine 204 and data aggregator 206. The HTM coordinates execution, or use, of node processors and resources, respectively. The HTM does this by processing a task list and producing a ready-to-run queue. The HTM is configured and controlled by a specialized node referred to as a K-node 178 in FIG. 2 or control node (not shown). However, other HTM control approaches may be used.

The node wrapper in FIG. 4 makes the node 180 identical in outward appearance to all other nodes in the adaptive computing machine 160 in FIG. 2 or the adaptive computing engine 100 in FIG. 1 regardless of its internal structure or functionality. The node wrapper also relieves the execution unit 212 from having to deal with myriad activities associated with task management and network interactions. Among other things, the node wrapper is responsible for disposing of each incoming network word such as the network word 188 in FIG. 2 in an appropriate fashion in one clock cycle.

The execution unit 212 in FIG. 4 is responsible for executing tasks (a task is equivalent to a module instance). The execution unit 212 may include a digital signal processor (DSP), a reduced-instruction-set (RISC) processor, a domain-specific processor, an application-specific integrated circuit (ASIC) or a reconfigurable (FPGA) fabric. Regardless of its form, the execution unit 212 interacts with the node wrapper through a standard interface.

The nodal memory 210 is accessible to both the node wrapper and the execution unit 212. The nodal memory 210 is where the node wrapper deposits incoming streaming data and where the execution unit 212 accesses that data. A node's own memory 210, however, is typically not where the execution unit 212 sends output data. To minimize memory accesses, output data is usually sent directly to the node(s) requiring that data: the consumer node(s). Nodal memory 210 is also used to store task parameters and is available to tasks for temporary (scratchpad) storage.

In a multi-node system such as the ACM 160 in FIG. 2 where the nodes 180 are both consumers and producers of streaming data, matching production and consumption rates is desirable. A producer task on one node may produce data at a rate that is either greater than or less than the rate at which a consuming task on another node can handle. If the producer is sending data at a greater rate than the consumer can handle, then data is eventually lost. If the producer is sending data at a lesser rate than the consumer can handle, then the consumer may be starved for data, thereby potentially causing the consumer to sit idle waiting for additional data.

The ACM 160 provides, via the Point-to-Point protocol, and the node wrapper in FIG. 4 a single, uniform and consistent mechanism for task management, flow control and load balancing. Task management ensures that a task is placed in execution only when it has sufficient input data and when there is sufficient space in the consumer node(s) to accommodate the data produced by the task. Flow control guarantees that a producer task will never overwhelm a consumer task with too much data in too short a time. Load balancing permits a producer task to distribute data among several alternate consumer nodes, thus allowing the producer task to operate at a potentially higher rate.

Figure 5:
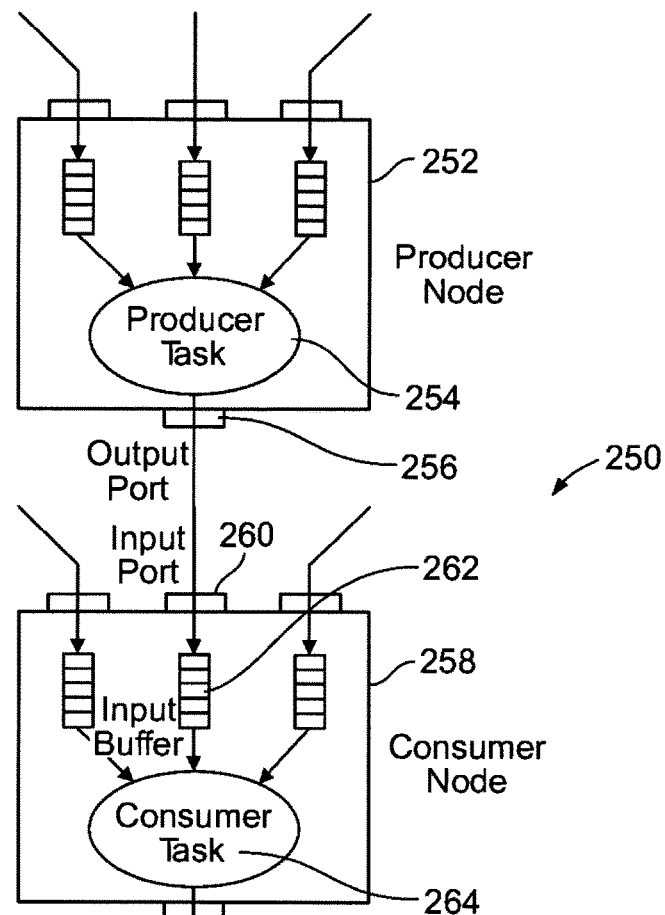
FIG. 5 shows basic components of a hardware task manager used for the node wrapper in FIG. 4.

Streaming data is transferred between two nodes 180 (points) via a point-to-point channel (point-to-point stream) 250 as shown in FIG. 5. Each PTP channel such as the point-to-point channel includes a producer node 252, a producer task 254, an output port 256, a consumer node 258, an input port 260, an input buffer 262 and a consumer task 264. The producer task 254 runs on the execution unit of the producer node 252 and produces a finite-sized block of PTP data per task activation. The block of data is sent over the PTP channel 250 as a sequence of PTP words. The sending of blocks is shown as task 1 in FIG. 5. The output port 256 on the producer node 252 is associated with the producer task 254.

The consumer task 264 receives PTP data from the PTP channel 252 via the input port on the consumer node 258. The circular input buffer 262 in the nodal memory of the consumer node 258 stores the incoming PTP data. A consumer task such as the consumer task 264 runs on the execution unit of the consumer node 258 and consumes a finite amount of the PTP data residing in the circular input buffer 262 per task activation (Task 2 in FIG. 5).

Figure 6:
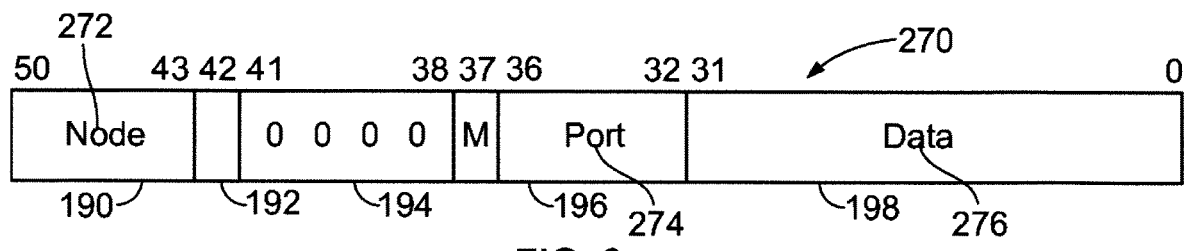
FIG. 6 shows a point-to-point channel used for streaming data in the ACM architecture in FIG. 2.

Data is conveyed over the PTP channel 252 when the producer task 254 transfers a 50-bit point-to-point word 270 as shown in FIG. 6 to the node wrapper in the producer node 252. The point-to-point word 270 has the same fields as the network word 188 in FIG. 3 and like elements/fields are labeled with the same element numbers in FIG. 5. The point-to-point word 270 includes a node word 272 in the route field 190, a port word 274 in the auxiliary field 196 and a data word 276 in the payload field 198. In this example, a $51^{st}$ bit, the security bit 192, is added later by the network 162 in FIG. 2. The node wrapper such as the node wrapper in FIG. 4, in turn, hands the PTP word over to the packet-switched network for transfer to the consumer node 258 in FIG. 5. The 8-bit route field 190 of the PTP word 270 provides the address in the form of the node word 272 of the consumer node such as the node 258 in FIG. 5. The port word 274 includes the low-order 5 bits of the auxiliary field 196 that indicate to which of the input ports of the consumer node the data is directed. When the PTP word arrives at the consumer node, the node wrapper deposits the 32-bit data word 176 in the payload field 198 into the circular input buffer associated with the indicated input port. The transfer is then complete.

The ACM 160 includes mechanisms for task management, flow control and load balancing. There is an input buffer associated with each input port. There is also a two's-complement signed count associated with each port, both input and output.

For an input port, the count is referred to as a consumer count since it reflects the amount of data in that port's input buffer that is available to be consumed by the associated task. A consumer count is enabled when its value is non-negative—that is, when its sign bit is 0. An enabled consumer count indicates that the associated input buffer has the minimum amount of data required by an activation of the associated task. At system initialization, or upon reconfiguration, a consumer count is typically reset to $-C$, where $C$ is the minimum number of 32-bit words required per task activation.

For an output port, the count is referred to as a producer count since it reflects the amount of available space in the downstream input buffer to accept the data that is produced by the associated task. A producer count is enabled when its value is negative—that is, when its sign bit is 1. An enabled producer count indicates that the downstream input buffer has space available to accommodate the maximum amount of data produced per activation of the associated task. At system initialization, or upon reconfiguration, a producer count is typically reset to $P-S-1$, where $P$ is the maximum number of 32-bit words produced per task activation and $S$ is the size of the downstream input buffer in 32-bit words.

Both consumer counts and producer counts are typically initialized to negative values, causing the consumer counts start out disabled while producer counts start out enabled. This initial state reflects the fact that input buffers are usually empty at system initialization/reconfiguration.

Figure 7:
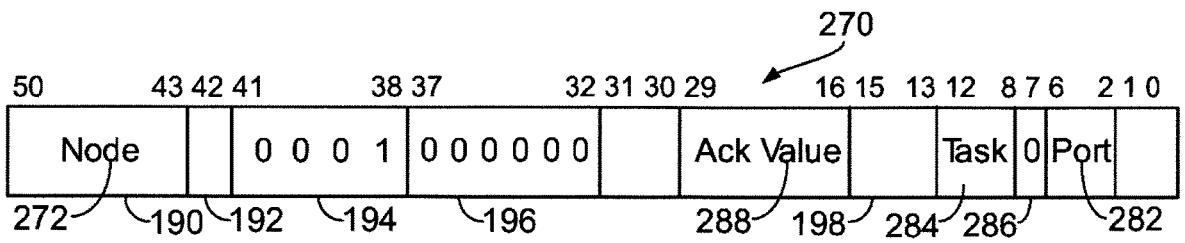
FIG. 7 shows a point-to-point network word used by the point-to-point channel in FIG. 6.

Consumer and producer counts are updated by a system of credits and debits in the form of forward acknowledgements and backward acknowledgements. Both types of acknowledgements are network words such as the acknowledgment network word 280 shown in FIG. 7. The acknowledgment network word 280 has the same fields as the network word 188 in FIG. 3 and like elements/fields are labeled with the same element numbers. The acknowledgment network 280 word is sent by a task as the last steps in a task activation. In both cases, the payload field 198 contains four subfields: a type of acknowledgement subfield 282 (one bit), a port subfield 284, (3) a task subfield 286 and an Ack Value subfield 288.

The sequence of acknowledgements that a task performs at the end of each activation is described below. For each output port of the task, a forward acknowledgement is sent to the consumer node specifying the consumer input port and the consumer task. The Ack Value is the number of PTP words the task just sent to the consumer input port. A backward acknowledgement (a self ack) is sent to the node on which the task resides specifying the output port and the task. The Ack Value is the number of PTP words the task just sent via the output port.

For each input port of the task, a backward acknowledgement is sent to the producer node specifying the producer output port and producer task. The Ack Value is minus the number of 32-bit words the task just consumed from the input port's buffer. A forward acknowledgement (a self ack) is sent to the node on which the task resides indicating the input port and the task. The Ack Value is minus the number of 32-bit words the task just consumed from the input port's buffer.

Hardware Task Manager

The hardware task manager 200 shown in FIG. 4 is the part of the node wrapper responsible for updating consumer and producer counts in response to incoming acknowledgements. It also monitors the sign bits of those counts and launches a task when an appropriate set of counts is enabled. This last responsibility is met using two signed counts that are associated not with a port but with a task: a task input count and a task output count. A task's input (output) count reflects the number of task consumer (producer) counts that are enabled. A task count is enabled when its value is non-negative. A task is enabled, and available for execution, when both its input count and its output count are enabled.

Incoming acknowledgements update various counts and cause tasks to be launched as follows. If a forward acknowledgement is received, the specified port is interpreted as an input port, and Ack Value is added to the corresponding consumer count. If the consumer count makes a transition from disabled to enabled (enabled to disabled), then the input count of the specified task is incremented (decremented) by 1. If a backward acknowledgement is received, the specified port is interpreted as an output port, and the Ack Value is added to the corresponding producer count. If the producer count makes a transition from disabled to enabled (enabled to disabled), then the output count of the specified task is incremented (decremented) by 1. If after a forward or backward acknowledgement is received, the specified task's input and output counts are both enabled, then the task is placed on the ready-to-run queue if it is not already on the queue. The task is launched when it reaches the head of the queue.

These actions embody the firing rule for tasks. They cause a task to be placed on the ready-to-run queue and ultimately executed when a sufficient number of consumer counts and a sufficient number of producer counts are enabled. What those sufficient numbers are is determined by the initial values of a task's input count and output count. If I (O) is the number of input (output) ports associated with a task and $IC_{initial}$ ($OC_{initial}$) is the initial value of the task's input (output) count, and if it is assumed all consumer counts are initially disabled and all producer counts are initially enabled as discussed above, then a task fires when −$IC_{initial}$ out of I consumer counts are enabled

AND (O−$OC_{initial}$) out of O producer counts are enabled

For example, for I=4,

If $IC_{initial}$=−1, then 1 out of 4 consumer counts must be enabled

If $IC_{initial}$=−2, then 2 out of 4 consumer counts must be enabled

If $IC_{initial}$=−3, then 3 out of 4 consumer counts must be enabled

If $IC_{initial}$=−4, then 4 out of 4 consumer counts must be enabled

For O=4,

If $OC_{initial}$=3, then 1 out of 4 producer counts must be enabled

If $OC_{initial}$=2, then 2 out of 4 producer counts must be enabled

If $OC_{initial}$=1, then 3 out of 4 producer counts must be enabled

If $OC_{initial}$=0, then 4 out of 4 producer counts must be enabled

The programming of the multi-processor system such as the ACE 100 in FIG. 1 and the ACM 200 in FIG. 2 may be accomplished using what may be termed as the Stream C programming language.

Stream C Modules

In a Stream C program, there is only one mechanism for expressing concurrency: through the concurrent operation of the program's modules (and module-like stream expressions). Syntactically, modules are very similar to C functions, but semantically, they are different. A C function (subroutine) initiates activity only when it is called. In a call, control is passed to the C function, usually together with some input arguments. The C function then performs a task/computation, and when finished, returns control together with any output result. Unlike C functions, modules are not called nor is control passed to or returned from modules. Instead, modules carry on ongoing interactions with other modules and the outside world though their input and output ports. Through these ports, a module receives streams of input values and emits streams of output values.

The syntax of a module prototype is identical to that of a C function prototype, with three exceptions. First, the keyword, stream, precedes a module prototype. This tells the compiler/linker that each module input and module output is associated with a stream of values of the specified type, not an individual value. Second, to permit a module to have multiple output streams, the module return type may be replaced by a parentheses-delimited list that is identical in syntax to the input parameter list. Third, to extend the notion of an array to modules, a square-bracket-delimited list of array indices may be inserted immediately after the module name and before the input argument list. The module arrays are discussed below.

The following are two examples of module declarations:

```
stream int moduleA(int, int);
stream (int, int) moduleB(int, int);
```

Parameter names have been omitted here since they are not required in a module declaration (in contrast to a module definition or module instantiation), but Parameter names may be included at the programmer's discretion, usually as a mnemonic aid, for inputs and, when there are multiple outputs, for the outputs as well. The two declarations, for example, might then be expressed as:

```
stream int moduleA(int a, int b);
stream (int x, int y) moduleB(int a, int b);
```

The first declaration indicates that moduleA has two input streams, both of integer type, and a single output stream, also of integer type. The second declaration indicates that moduleB has two input streams, both of integer type, and two output streams, also both of integer type.

Like the definition of a C function, the definition of a module has a body delimited by curly braces ({ and }). Also as in the definition of a C function, each module input (and output in the case of multiple outputs) is assigned an identifier. The following are two examples of module definitions:

```
stream int moduleA(int a, int b)
{
    // Module Body
}
stream (int x, int y) moduleB(int a, int b)
{
    // Module Body
}
```

A module instantiation is the module counterpart to a C function call. Like a function call, a module instantiation is where a module gets used. While the syntax of these two types of expressions are similar, the semantics are different. A fragment of C code may be expressed as:

```
int x, y;
int F(int, int);
  .
  .
  .
int z = F(4, x + 5*y);
```

The first statement declares that x and y are integers, while the second declares that F is a function with two integer parameters and an integer result. The last statement is an assignment containing the function call F(4, x+5*y), which has two arguments, the expressions 4 and x+5*y, corresponding to the two parameters of F.

The stream version of this code fragment is as follows:

```
stream int x, y;
stream int F(int, int);
  .
  .
  .
stream int z = F(4, x + 5*y);
```

In the stream version, each of the statements above is prefaced with the keyword stream. The change in syntax produces a dramatic change in semantics. Instead of individual values, streams of values are used. Thus the first statement declares that x and y are integer streams, while the second declares that F is a module with two integer-stream inputs and an integer-stream output. The last statement is now an assignment containing the module instantiation F(4, x+5*y), which has two arguments, the stream expressions 4 and x+5*y, corresponding to the two parameters of F.

In the case of the function call, each execution of the assignment z=F(4, x+5*y) causes expressions 4 and x+5*y to be evaluated and the two resulting values to be supplied as parameters in a call to function F. After some period of time, F returns a value. In the case of the module instantiation, there is no execution of the assignment z=F(4, x+5*y) and no call to module F. Instead, an instance of module F is created (instantiated) at system initialization, just before the Stream C program begins execution, thereby making the instance ready to receive streams of integers on its two input ports and produce a stream of integers on its output port. And once program execution commences, the instance of F remains operative until program termination i.e., the instance of F is persistent.

This simple example illustrates the general mechanism used in Stream C to create a community of interacting modules. Each module instantiation causes a separate module instance to be created at system initialization. Once created (instantiated), a module instance is ready to receive streams of values on its input ports and produce streams of values on its output ports. Furthermore, once program execution commences, the module instance remains operative until program termination.

The general form of the instantiation of a module with multiple output ports is:

(<identifier-list>)<module-identifier>(<expression-list>)

While the input arguments are expressions, the output arguments are identifiers. These identifiers serve to name the otherwise nameless output streams. The stream assignment statement above plays the same role by assigning the name z to the otherwise nameless output stream of F(4, x+5*y). For example:

```
stream int w, x, y, z;
stream (int, int) F(int, int);
  .
  .
  .
(w, z) = F(4, x + 5*y);
```

As before, F has two integer-stream inputs, but in contrast to the earlier example, F now has two integer-stream outputs. Those two output streams appear in the instantiation of F as the list of identifiers (w, z), which serves to give the two output streams the names w and z.

Statements within a module body fall into two categories (or domains), stream statements that involve only streams and thread statements that include the entire range of C statements as well as statements that allow a thread to read from and write to streams. Because each module instantiation causes a separate module instance to be created at system initialization, Stream C does not allow a module to have within its body, or within the body of a submodule, an instantiation of itself. In other words, circularity in module references is not allowed. This prohibition helps avoid the difficult task of instantiating an infinite number of module instances.

In a Steam C module, there is no notion of returning control, and so the return statement is inappropriate. In a module, output values are simply inserted into a module output stream. But in order to do that, the output stream must have a name. For modules with a parentheses-delimited list of named output streams, that's not a problem. It is a problem, however, when the module prototype provides only the type of the module's sole output stream. In that case, code in the module's body, either in the stream domain or thread domain, can use the keyword out as the name of the default module output stream. This usage is illustrated in the following code fragment.

```
stream int moduleA(int a, int b)
{
    .
    .
    .
    out = a + b;
    .
    .
    .
}
```

Modules and the streams they are partnered with provide the framework for the web of interactions and concurrent activity typical of a Stream C program, while functions provide the computational building blocks of a program. Although modules deal with streams of values, that does not prevent modules from accessing individual values within a stream and supplying those values to a function. Likewise, a module can access the output value of a function and insert that value into a stream. A function, on the other hand, cannot reference a module because there is no mechanism within a function for such interaction. Because of this asymmetry in capabilities, modules are found at the higher levels of a program hierarchy, while functions are found at the lower levels.

While the differences between modules and functions are substantial, there is one area in which they are similar. They both support side effects, that is, they both may manipulate external data structures independently of their input and output ports. This stems from the fact that modules may contain threads that may have side effects.

Figure 8A:
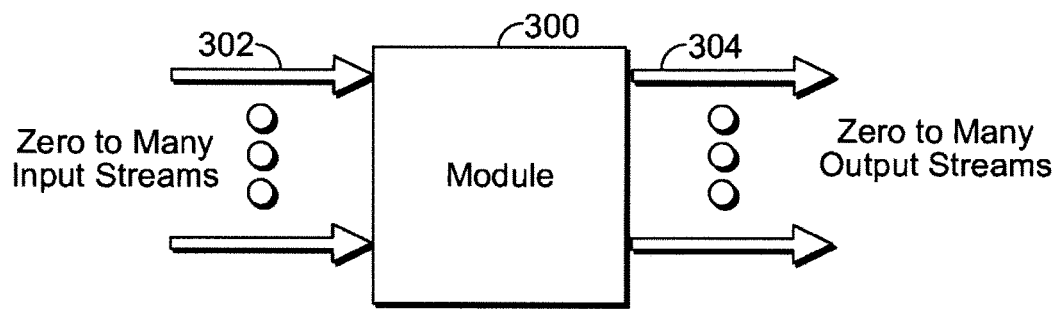
FIGS. 8A-8D are diagrams of modules in relation to nodes for different stream flows.

FIG. 8A shows a generic module which includes a module 300 and a number of input streams 302 (from zero to N) which provide data/control to the module 300 and a number of output streams 304 (from zero to N) which provide data/control to the next module/function. A module with no output streams is a "sink" and a module with no input streams is a "source."

Figure 8B:
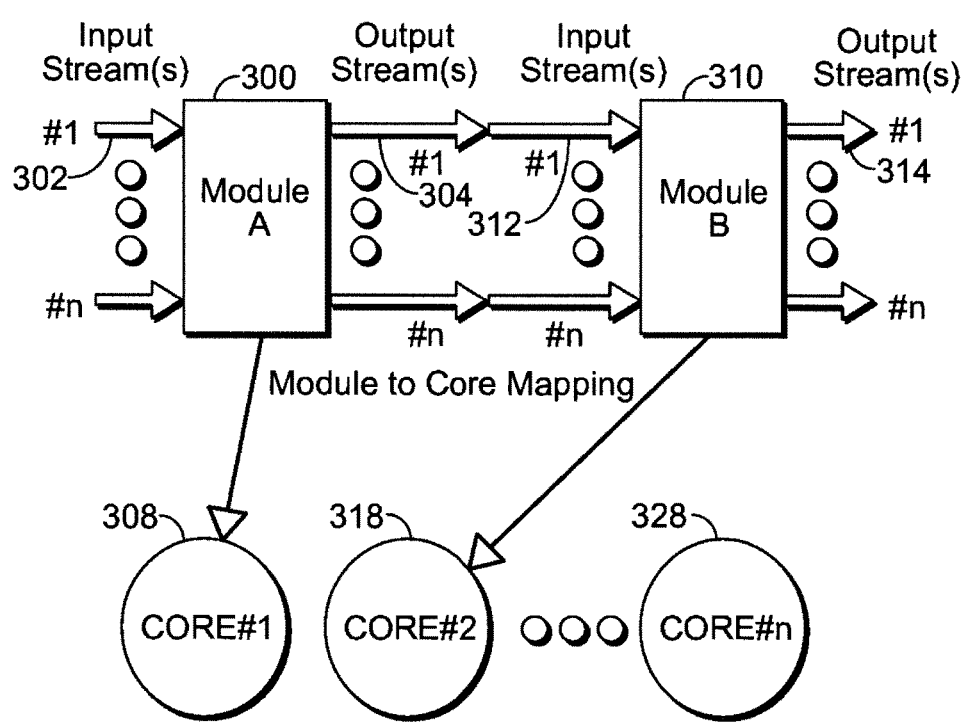

FIG. 8B is a diagram showing two modules, module A 300 and moduleB 310 each having corresponding input streams 302 and 312 and output streams 304 and 314. The output streams 304 of Module A 300 are attached to the input streams 312 of Module B 310. The Module A 300 is mapped to run on a CPU core 308 and the Module B 310 is mapped to run on a second CPU core 318. The cores 308, 318 and 328 are similar to the nodes 180 in FIG. 2.

Figure 8C:
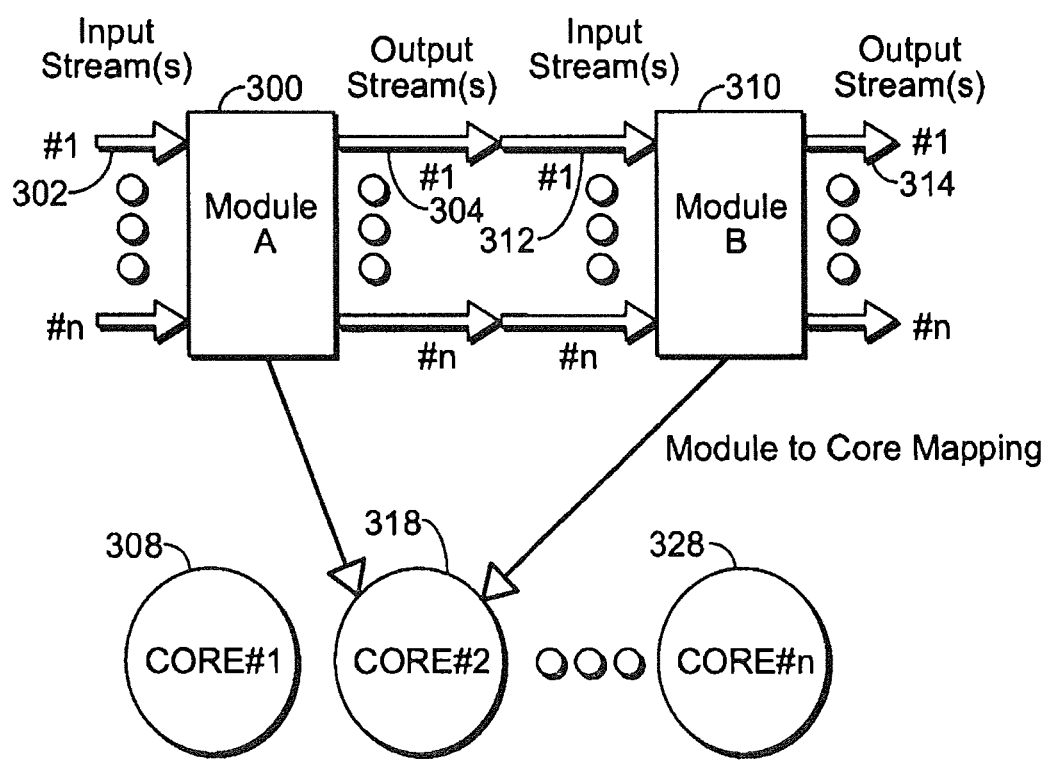

FIG. 8C is a diagram that shows the mapping of both module A 300 and moduleB 310 onto the same CPU core such as the CPU core 308. In this instance the modules 300 and 310 act like any other separate thread of control. An operating system which is running on the second core 318 may schedule the modules 300 and 310 based on preemptive multi-tasking or run to completion/release. Since both modules 300 and 310 and input/output streams 302, 312 and 304, 314 are "persistent" (that is they remain ready to perform processing) additional information must be provided to a conventional operating system about when to schedule a module based on both the availability of "enough" input stream data to perform a computation and "enough" space so that the output stream can deliver the computed data.

A variety of different algorithms can be used to perform the Module to Core Mapping. These may include cache proximity where modules which share the greatest number of streams are placed in cores which share a L1 cache followed by a shared L2 cache followed by a shared L3 cache followed by a shared DRAM. They may also include a physical proximity algorithm where modules which share the greatest number of streams are placed in cores which are physically adjacent to each other. For example the algorithm may start with the die and then the integrated circuit on the motherboard, then the motherboard in the rack, then the rack in the floor of the building, then the building geographically adjacent. Another algorithm may be the next available free where modules are allocated to cores based on the next "free" core based on either CPU usage (current or average weighted over time) or the next sequentially available core. Another algorithm may be a predictive load that selects the modules and cores based on estimated statistical sampling. A running average of core utilization is used to load modules to the lightest loaded core. Another algorithm may be user specified where a user specified virtual core ID is used to place all modules onto a physical core ID. When the number of virtual core ID's exceeds the physically available cores then multiple modules are evenly loaded across all available physical cores.

Figure 8D:
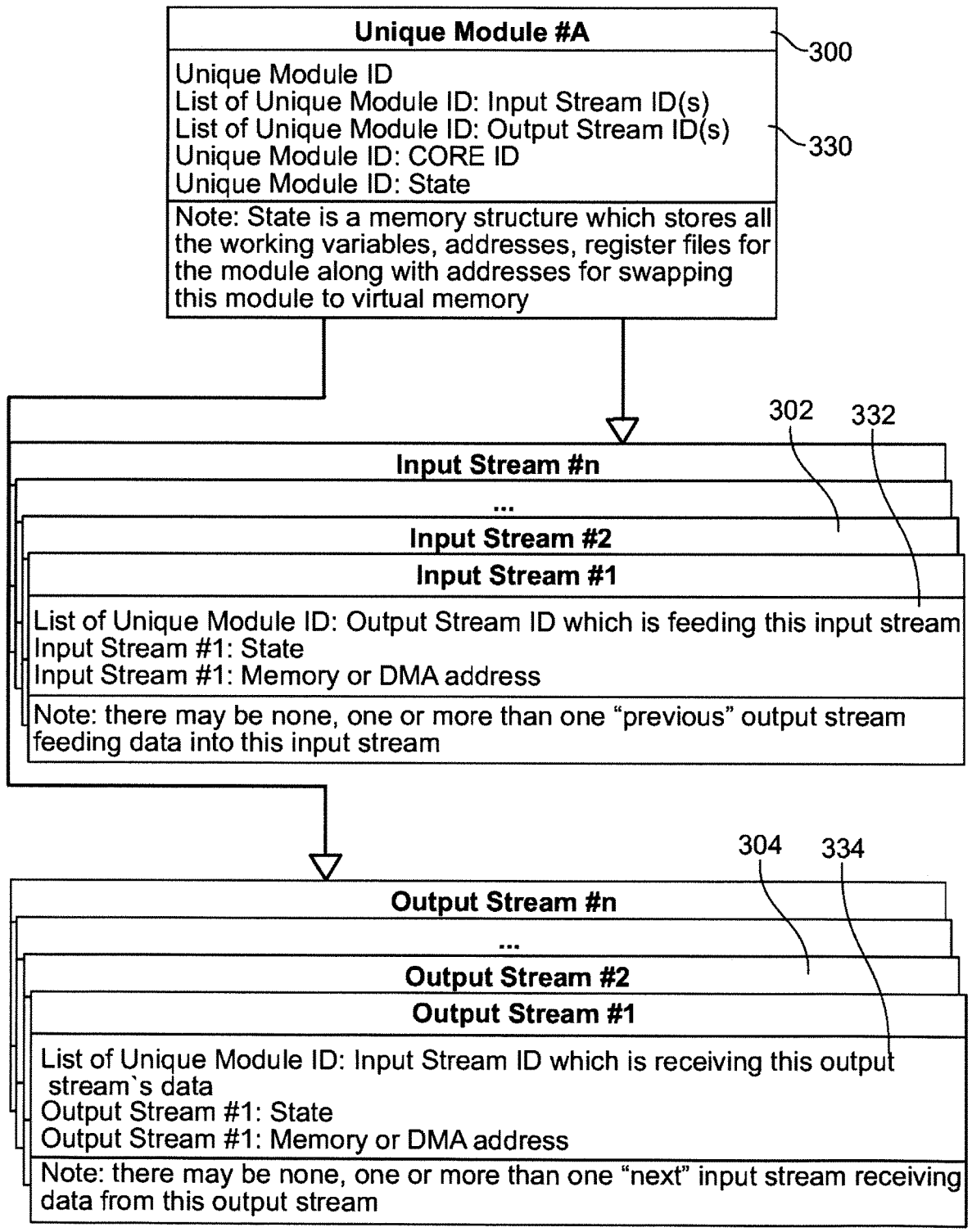

FIG. 8D show various data structures 330, 332 and 334 that may reside in the module A 300 and are used in the input and output streams 302 and 304. The data structures 330, 332 and 334, which reside either in memory/cache or a TLB, contain the critical information which is required for either a single core or a multi-core system to schedule and transport data from input streams such as the input stream 302 to output streams such as the output stream 304, input streams 302 into modules such as the module A 300, and the module A 300 out to output streams 304. For each module there is information that uniquely identifies the module, uniquely identifies all the input streams into that module, uniquely identifies all the output streams of that module, uniquely identifies how input and output streams are "connected," uniquely identifies the core, and maintains state information so that a module may be relocated from a core to another core, or swapped out via virtual memory. Streams can be dynamically added or deleted from modules, and modules can be dynamically added or deleted from cores.

Streams

The term stream in the Stream C programming language refers to a sequence of data values, all of the same type and typically made available over time. In Stream C, however, streams provide much more than a framework for input and output. Streams are elevated to first-class objects, a status roughly comparable to that of variables. This means that a stream may be bound to an identifier (i.e., it can be named), an input parameter of a function (i.e., an input parameter of a module), the output of a function (i.e., an input parameter of a module), a parameter within an expression and the output of an expression A stream conveys values of a single type from one or more stream sources to one or more stream destinations. The precise details of how this transport is accomplished is implementation dependent, and depends upon, among other things, whether the stream is confined to a single semiconductor die or whether the stream spans several meters or possibly even thousands of kilometers. Except when dealing with performance issues, a programmer need not be concerned with those details, and need only be concerned with those aspects of a stream that relate to four stream attributes: the stream type, the stream name, the stream sources and the stream destinations.

The stream type indicates the type of values being conveyed. The type which may be any legitimate C type, including pointers and types defined via typedef, may be specified implicitly by context for example, by appearing as a module input or output parameter or explicitly using a stream declaration as described below.

The stream sources are the points at which values are placed into the stream. Possible stream sources are include an input parameter of a module definition, an output of a module instantiation, the output of a stream expression and a thread (discussed below). The stream destinations are the points to which the stream conveys values. Possible stream destinations include an output parameter of a module definition, an input argument of a module instantiation, an input of a stream expression and a thread. An optional stream name is a name/identifier is assigned to a stream when the stream appears as a module input or output parameter or when it is introduced in a stream declaration. An example of an unnamed stream is the output stream of a stream expression that has not been assigned a name via a stream assignment.

The notion of stream attributes is illustrated in the following code fragment containing a declaration of a function F and a partial definition of a module M.

```
stream int F(int, int);
stream (int zStrm) M(int xStrm, int yStrm)
{
    .
    .
    .
    zStrm = xStrm*yStrm + F(xStrm, yStrm);
    .
    .
    .
}.
```

There are three named streams here: xStrm, yStrm and zStrm, all of type int. xStrm and yStrm each have a single source: an input parameter of module M. The destinations of xStrm and yStrm are represented by the two instances of xStrm and yStrm, respectively, appearing in the assignment expression in the body of M. (Recall that, in C, an assignment is also an expression.) Those instances represent inputs to the assignment expression. xStrm and yStrm thus each have a single source and two destinations.

A stream expression is identical to a C expression, except that in place of variables, there are now input streams. A stream expression also has an output stream, which carries the results from expression evaluations. By default, this output stream is nameless, but it can be assigned a name using a stream assignment, which is just what we've done in the above assignment. Thus the output stream of the stream expression $x\text{Strm}*y\text{Strm}+F(x\text{Strm},y\text{Strm})$ is assigned the name zStrm by the stream assignment $z\text{Strm}=x\text{Strm}*y\text{Strm}+F(x\text{Strm},y\text{Strm})$ Either of these two expressions may be considered the source of zStrm. The destination of zStrm is the output stream of module M, which is denoted by the output parameter zStrm of module M.

stream(int zStrm) M(int xStrm, int yStrm)
xStrm thus has a single source and a single destination.

The most crucial properties of a stream relate to the stream's role as a conveyor of values. There are four such properties: a) values do not enter a stream except at stream sources or at system initialization using the initialize ( ) function; b) Values entering a stream at a single source are totally ordered in time; c) once entered into a stream, a value is eventually delivered to all stream destinations; if there are multiple destinations, then a separate copy of the value is delivered to each destination; and d) values from a single source are received at each stream destination in the same order in which they entered the stream i.e., there is no leapfrogging of values in a stream. These four properties are the only guarantees that a stream provides regarding the transport of values. Any other property that does not follow as a logical consequence from these four is not a general stream property.

Because a stream is obliged to only deliver values eventually, the latency of a stream, the time it takes a value to travel from a stream source to a stream destination, is indeterminate. In fact, the latency may vary with time and between different source-destination pairs of the same stream. Fixed or at least, bounded latencies, however, can still be achieved by relying upon guarantees provided by the system implementation (rather than the programming model). A source-destination pair confined to a single semiconductor die, for example, will usually have bounds on its latency.

The above four properties also have implications for stream determinacy and indeterminacy (non-determinism). For a stream with a single source, the four properties ensure deterministic stream behavior. That means that the order in which values are placed into a single-source stream completely determines the order in which values are delivered to all stream destinations. For a stream with multiple sources, however, the situation is very different. To illustrate the issues arising from multiple stream sources, consider the following adaption of the code fragment from the preceding section. (out is the default output stream of a single-output module).

```
int F(int);
stream int M(int xStrm, int xStrm)
{
    .
    .
    .
    out = xStrm*xStrm + F(xStrm);
    .
    .
    .
}
```

The two input parameters of module M are the same: xStrm. From the four properties, values entering xStrm through the first input parameter of module M will be received at each of the three destinations of xStrm in the same order in which they entered the stream. Values entering xStrm through the second input parameter of module M will be received at each of the three destinations of xStrm in the same order in which they entered the stream. That means that the two streams of values are merged or interleaved before reaching each destination of xStrm.

How interleaving is carried out is influenced, in general, by program structure. The missing parts of the program above, for example, may be structured in a way that leads to an interleaving that strictly alternates between parameter-one and parameter-two values. So, for example, if the integers arriving on the two input parameters (streams) xStrm of module M begin with the sequences:

| xStrm Source One | xStrm Source Two |
|---|---|
| 6 | 3 |
| 8 | 5 |
| 1 | 9 |
| . | . |
| . | . |
| . | . | then the sequence arriving at each of the three destinations of xStrm in the expression out=$x$Strm*$x$Strm+$F$($x$Strm)

might begin with

| xStrm Destinations |
|---|
| 6 |
| 3 |
| 8 |
| 5 |
| 1 |
| 9 |
| . |
| . |
| . |

Such program-imposed determinism though is not always the case, and there are situations in which values from multiple steam sources are interleaved non-deterministically. Moreover, depending on the target system, those nondeterministic interleavings may differ from one stream destination to another. Thus, for example, if the values arriving on the two input parameters (streams) of module M are the same as above, then the sequence arriving at the three destinations of xStrm might begin with:

| xStrm Destination One | xStrm Destination Two | xStrm Destination Three |
|---|---|---|
| 6 | 3 | 3 |
| 8 | 5 | 6 |
| 1 | 6 | 5 |
| 3 | 8 | 8 |
| 5 | 1 | 1 |
| 9 | 9 | 9 |
| . | . | . |
| . | . | . |
| . | . | . |

This indeterminacy in order of arrival of values at the destinations of a multi-source stream contrasts with the fixed order of arrival across all destinations of a single-source stream. That fixed arrival order allows adopting notation that is useful in below. For a single-source stream ssStrm and a non-negative integer ssStrm(i)

denotes the $i^{th}$ value appearing at all destinations of ssStrm. By convention, ssStrm(0) denotes the first value appearing at all destinations.

When a value arrives at a stream destination, if the destination is an output parameter of a module definition or an input argument of a module instantiation, then the value is handed over to a stream on the other side of a module boundary. The value thus remains in transit. If the destination is an input of a stream expression or a thread then the value comes to rest in a FIFO queue.

To illustrate remaining in transit, the following code fragment is shown.

```
stream int module1(int);
stream int module2(int xStrm)
{
    .
    .
    .
    out = module1(xStrm);
    .
    .
    .
}
```

The code fragment includes two modules, module1 and module2, each with a single input stream and single output stream and two named streams, xStrm and yStrm, both within the definition (body) of module2. The sole destination of xStrm: module1(xStrm) is an input argument of an instantiation of module1. A value arriving at this destination is simply passed across module1's boundary to an internal stream of module1. The situation is similar for values arriving at the sole destination of yStrm:

stream (int yStrm) module2(int xStrm)

Since this destination is an output parameter of a module2, arriving values are simply passed across module2's boundary to a stream external to module2.

Another example is the case where a stream destination is an input of a stream expression such as the following code fragment.

```
stream int F(int, int);
stream int M(int xStrm, int yStrm)
{
    .
    .
    .
    out = xStrm*yStrm + F(xStrm, yStrm);
    .
    .
    .
}
```

Within the body of module M is the stream expression $x$Strm*$y$Strm+$F$($x$Strm,$y$Strm)

which contains two destinations of xStrm and two destinations of yStrm. It also contains the two operators * and + and the function F, which are ordinary C constructs. That means that in order to evaluate this expression, the two operators and the function F must be supplied with individual values.

The queues are automatically inserted by the Stream C linker/loader and are managed by the Stream C runtime. Among the responsibilities of the runtime is signaling when a queue is empty and ensuring that no queue ever overflows. Each queue is guaranteed to have a capacity of at least two values of the associated data type, although a programmer may request a specific amount via a pragma as described below. In the stream of this example, there are four queues, one for each of the four stream destinations (stream expression inputs). These queues are largely invisible to the programmer.

Once a Stream C program begins executing (operating), the only way for a value to enter a stream is through a stream source. One of more streams may form a directed cycle which requires a value already in the stream. The simplest such cycle occurs when a stream appears on both sides of a stream assignment as in:

$x$Strm+=$y$Strm which is equivalent to xStrm=xStrm+yStrm

Figure 9A:
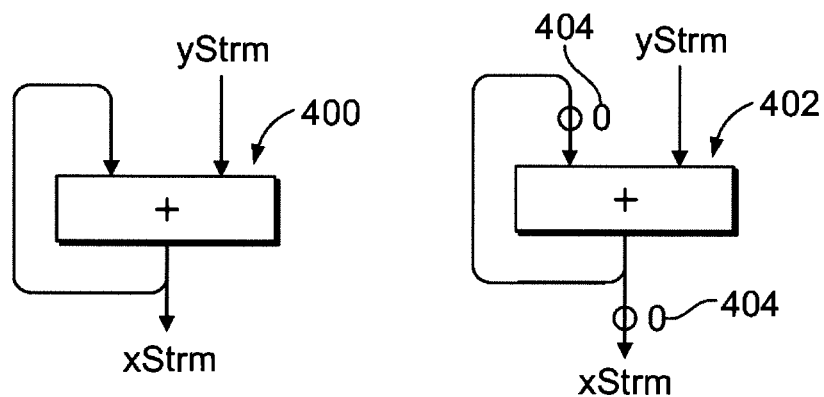
FIGS. 9A and 9B are graphical representations of the assignments of values to streams.

FIG. 9A is a first graphical representation 400 of this assignment where the directed cycle consists of the feedback path from the output of the + operator to one of the two inputs of the same operator. It is the lack of a value on this path that prevents the + operator from consuming a value from each input stream and producing a value on the output stream. So unless a value 404 is placed in the feedback path as shown in the second graphical representation 402 before execution begins, the + operator will never fire.

Another issue relates to changing the offset of one single-source stream relative to another single-source stream. For example, if aStrm and bStrm are both inputs to the same module or stream expression, as in aStrm+bStrm which is represented graphically in FIG. 9B, and the module or expression consumes values from the streams in pairs, one from aStrm and one from bStrm. If it is desired that aStrm(n) (i.e., the $n^{th}$ value arriving on aStrm) to match up with bStrm(n+2) (i.e., the $n+2^{nd}$ value arriving on bStrm). Thus aStrm(0) would match up with bStrm(2), aStrm(1) would match up with bStrm(3), and so on.

The solution to both issues is provided by the stream initialization statement, which has the form <stream-identifier>.initialize(<value-list>);

When the Stream C compiler/linker/loader encounters this statement, it takes the statement as a directive to insert a FIFO queue at each destination of <stream-identifier> whether the destination is an output parameter of a module definition, an input argument of a module instantiation, an input of a stream expression or a thread; size the queue at each stream destination so that it is sufficient to hold at least n+1 values of type T, where n is the number of values in <value-list> and T is the type of <stream-identifier>; and place the values in <value-list> into the queue in order, with the first value in <value-list> placed at the front (head) of the queue.

For example, in FIG. 9A, to prevent deadlock, a value 404 is inserted in the feedback path and also in the expression output in the graphic representation 402 by initializing xStrm with the value 0 via the statement xStrm.initialize(0);

This statement causes two FIFO queues to be created, one for each destination of xStrm. (the queue at the destination of the feedback path will already have been inserted as described in the preceding section). Assuming that xStrm is of type int, then the size of each queue is at least 2*sizeof (int), and at the head of each queue at system initialization is the int value 0. This is illustrated graphically in the flow diagram 402 in FIG. 9A. With xStrm thus initialized, the values appearing on the output of the assignment xStrm+=yStrm are:

0
yStrm(0)
yStrm(0) + yStrm(1)
yStrm(0) + yStrm(1) + yStrm(2)
.
.
.

Figure 9B:
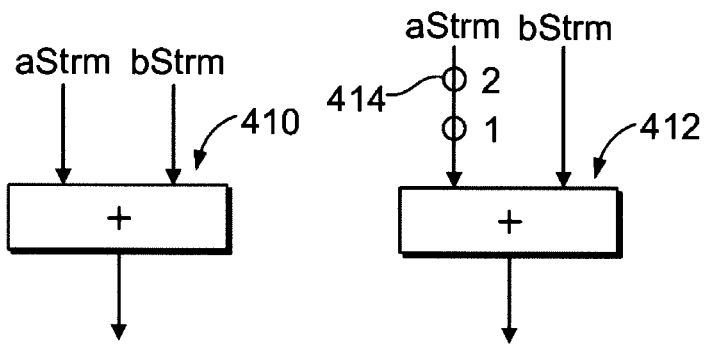

Changing the offset of aStrm relative to bStrm in a second graphic representation 412 in FIG. 9B is handled in a similar manner. Here, however, two values are inserted into the aStrm FIFO queue since it may be desirable to offset aStrm by two values relative to bStrm. That is accomplished using the following stream initialization statement in which 1 and 2 have been chosen as two values 414 to be inserted into aStrm's queue at system initialization.

aStrm.initialize(1, 2);

The effects of this initialization are illustrated graphically in the representation 412 in FIG. 9B. With xStrm thus initialized, the values appearing on the output of the assignment xStrm+=yStrm are then:

1 + bStrm(0)
2 + bStrm(1)
aStrm(0) + bStrm(2)
aStrm(1) + bStrm(3)
.
.
.

As is the case for C variables, all streams must be declared before being used, although certain stream declarations are made implicitly by context, for example, by appearing as module input or output parameters. For explicit stream declarations, the syntax follows that for C variable declarations, but with the declaration now beginning with the keyword stream:

stream <storage-class-specifier>$_{optional}$ <type> <identifier-list>;

Some examples of stream declarations without a storage class specifier are:

stream int xStrm, yStrm;
stream char cStrm;
stream double dStrm;

Of the five storage class specifiers in C-auto, register, static, extern and typedef—only static is permitted in a stream declaration, as in stream static int xStrm, yStrm;

The semantics of a static, as well as a non-static, stream declaration is determined by the context in which the declaration appears. There are three such contexts, each with its own scope rule. In each case, the stream-declaration scope rule is identical to that of the variable-declaration counterpart. For a stream declaration, with no storage class specifier and appearing inside a module, the declaration scope extends from the declaration to the end of the module. For a stream declaration, with no storage class specifier and appearing outside all modules (and functions), the declaration scope is global—that is, it is visible to the entire program. For a stream declaration, with the static storage class specifier and appearing outside all modules (and functions), the declaration scope extends from the declaration to the end of the source file in which the declaration appears.

Absent from this list are several declaration forms involving storage class specifiers that pertain to variables but not streams. In C, automatic variables, those variables declared with the auto storage class specifier or with no specifier at all, lose their values between function invocations. But since streams do their work only within modules and since modules are not invoked (they are always active), automatic streams are an incongruous concept. The auto storage class specifier is therefore not applied to stream declarations.

A variable declaration with the static specifier and appearing inside a function indicates that the declared variable retains its value between function calls (function invocations). In the case of modules, however, there is no notion of a call, and so the static specifier has no meaning inside a module. The static specifier is therefore not used within module scope.

For variable declarations, the extern storage class specifier helps to distinguish those declarations of global variables that act as declarations and definitions from those that act as merely declarations. In the case of streams, however, a declaration is never a definition because a stream declaration never causes storage to be set aside. Storage is allocated only at stream destinations as described below in the section on Stream FIFOs. The register and typedef storage class specifiers have no relevance to streams and do not appear in stream declarations.

Stream expressions are the stream counterpart to ordinary C expressions. Apart from substituting input streams for all variables and an output stream for the result, the two types of expressions are very similar. Expressions combine variables and constants to produce new values while stream expressions combine streams and constants to produce new streams. The structure of C expressions and stream expressions are nearly identical. All C operators are valid operators in stream expressions. The same operator precedence applies in both C expressions and stream expressions. C function calls are permitted in stream expressions, just as they are in C expressions. Instantiations of modules with a single output stream are permitted in stream expressions, and are treated similarly to function calls.

The differences between C expressions and stream expressions lie primarily in when and how they are evaluated. A C expression is evaluated when the thread of control reaches the statement containing the expression. The evaluation is carried out by first replacing each variable by its current value and then performing the requisite operations according to the rules of operator precedence. The value returned by the final operation is then supplied as the evaluation result.

Unlike evaluation of C expressions, evaluation of stream expressions in the C Stream programming language is not tied to a thread of control. Instead, stream expressions are evaluated opportunistically. As before, evaluation is carried out by performing the requisite operations according to the rules of operator precedence. Instead of substituting values for variables, a value is consumed (popped) from each FIFO queue belonging to an expression input. A FIFO queue is inserted at all stream destinations that are inputs of stream expressions. The evaluation is opportunistic because it is performed whenever there is at least one value in each input FIFO queue of the expression. The result produced by the evaluation, as before, is the value returned by the final operation of the evaluation. That result, however, is handled differently from the C expression case. For a C expression, the use to which the result is put is determined by the context of the expression. For a stream expression, the result is simply placed into the expression's output stream (which may or may not have a name, depending upon whether the expression is an assignment).

An example of the stream expression may be shown in the following expression in which xStrm, yStrm and zStrm are all streams of type int.

$$xStrm*yStrm+5*zStrm$$

The values arriving on the three streams begin as follows:

| xStrm | yStrm | zStrm |
|---|---|---|
| 1 | 2 | 3 |
| 4 | 5 | 6 |
| 7 | 8 | 9 |
| . | . | . |
| . | . | . |
| . | . | . |

The first three values placed into the (unnamed) output stream of xStrm*yStrm+5*zStrm are then:

| Output Stream of xStrm*yStrm + 5*zStrm |
|---|
| 17 = 1*2 + 5*3 |
| 50 = 4*5 + 5*6 |
| 101 = 7*8 + 5*9 |
| . |
| . |
| . |

Among stream expressions, stream assignments are of special interest. There are two types of such stream assignments, the first type has the form <stream-identifier>=<stream-expression>

Like their C counterparts, assignments to variables, stream assignments of this type have a side effect. In addition to supplying values to its output stream, a stream assignment makes the output of the right-hand-side (RHS) expression a source of the left-hand-side (LHS) stream, and in the process makes the output stream of the RHS expression the output stream of the assignment. The stream assignment also gives a name to the otherwise nameless output stream of the RHS expression. Although a name is not needed for the output stream of a subexpression of a larger expression, a name is essential when the output stream must be directed to a destination outside any enclosing superexpression.

The stream assignment statement in the following code fragment is an example. A stream expression, assignment or otherwise, becomes a stream statement when it is followed by a semicolon.

```
int F(int, int);
int G(int);
stream int M(int xStrm, int yStrm)
{
        .
        .
        .
        out = F(xStrm, G(yStrm));
        .
        .
        .
}
```

The expression, F(xStrm, G(yStrm)) and the subexpression, G(yStrm) each have an output stream as stream expressions. In the case of G(yStrm), the output stream is unnamed since the destination of the stream is clear from the context of the expression: the destination is the second input argument of the function F in the superexpression F(xStrm, G(yStrm)). In the case of the output stream of F(xStrm, G(yStrm)), however, a name is required since the destination is outside the expression. That name is assigned in the assignment expression out=*F*(*x*Strm,*G*(*y*Strm))

With this assignment, the output of F(xStrm; G(yStrm)) becomes a source of zStrm, which has a single destination, the output parameter of Module M.

The second type of stream assignment is of the form (<comma-separated-list-of-stream-identifiers>)
=<module-instantiation>

It arises when it is desirable to make the outputs of a multi-output module the sources of multiple named streams. To illustrate, the following multi-output module:
    stream (int, int) tap(int, int, int);
If the first output of tap is the source of int stream x, and the second output of tap is the source of int stream y. That is accomplished with the stream assignment
    (int x, int y)=tap(arg1, arg2, arg3);
The assignment makes the $i^{th}$ output of the module a source of the $i^{th}$ stream and gives names to the otherwise nameless output streams of the module.

Statements within the body of a module fall into two categories (domains), thread and stream. Stream statements deal with streams but not variables. Thread statements deal with variables, and, in a few cases, with streams as well. Statements in the thread domain are mostly C statements, and like C statements, they are imperative (procedural) in nature defining a step-by-step procedure. Associated with such a procedure is a sequential flow of control, often called a thread, which governs the order in which statements are executed. Stream statements, in contrast, are declarative. Each such statement makes a declaration about the streams appearing in the statement. There is no notion of a step-by-step procedure, as there is in the thread domain, and the order of stream statements within a module body is therefore immaterial with one exception. Just as variables must be declared before being used, so too streams must be declared before being used.

Because of the nature of the stream domain, there are no counterparts to those C statements that deal with control flow, specifically, if-else, else-if, switch, for, while, do-while, break, continue, goto and return. In fact, the only statement type in the stream domain is the stream counterpart to the C expression statement, and, as in C, the most common expression statement is the assignment statement. A stream expression statement has one of the two forms <stream-expression>;
stream <stream-expression>;

while a stream assignment statement has one of the two forms

<stream-identifier> = <stream-expression>;
stream <stream-identifier> = <stream-expression>;
(<comma-separated-list-of-stream-identifiers>) = <module-instantiation>

Figure 10:
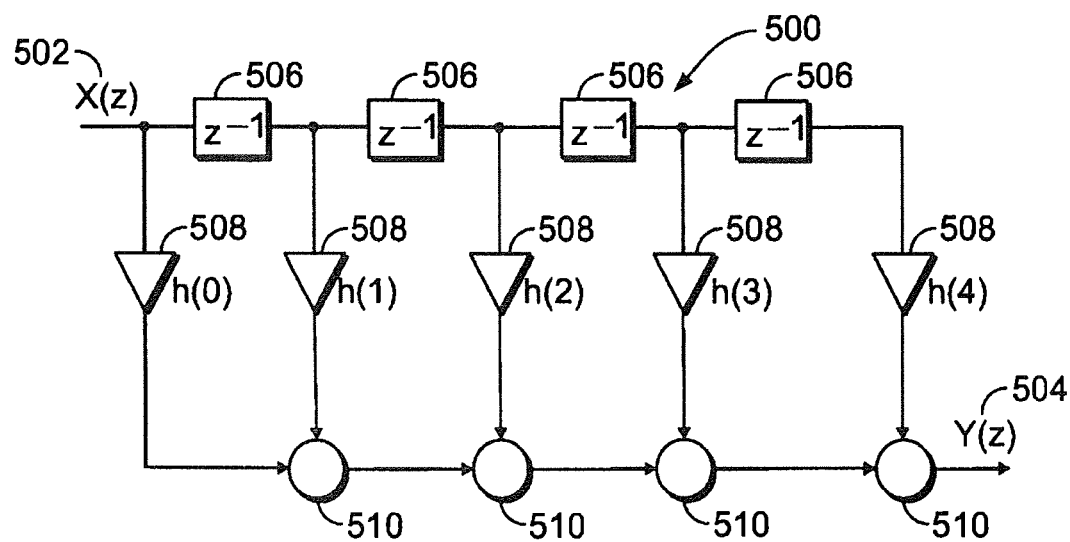
FIG. 10 is a graphical depiction of a five-tap FIR filter that may be modeled using modules and stream concepts.

An example application using modules, stream initialization, stream declarations, stream expressions and stream statements is a finite-impulse-response (FIR) filter, a commonly used construct in digital signal processing. A FIR filter transforms a discrete-time input signal into a discrete-time output signal. FIG. 10 is a graphical depiction of a 5-tap FIR filter 500 in which X(z) represents a discrete-time input 502 and Y(z) represents a discrete-time output 504. A series of unit delays 506 labeled $z^{-1}$ each cause the incoming discrete-time signal to be delayed by one clock cycle. A series of multipliers 508 each of which multiply the incoming discrete-time signal by a constant coefficient h(i). Finally, a series of adders 510 labeled Σ each of which sums the two incoming signals. The filter 500 is termed a 5-tap filter because 5 delayed versions of the incoming discrete-time signal are each multiplied by a separate coefficient with the 5 resulting products being summed together.

A discrete-time signal is represented as a stream of samples. The multipliers 508 and adders 510 are each represented as a stream expression. The unit delay is represented by stream initialization. By initializing one stream with one or more values, the values are offset (delay) in that stream relative to the values in a second stream. This is the principle underlying operation of the UnitDelay module.

```
stream int UnitDelay(int X)
{
    out = X;
    out.initialize(0);
}
```

In the body of unit Delay, the stream assignment statement
    out=x;
makes X, the input stream of Unit Delay, the source of out, the default output stream of UnitDelay, while the stream initialization statement:
    out.initialize(0);
inserts the value 0 into out at system initialization. This initial value in out has the effect of offsetting (delaying) all subsequent values in out by one value.

The following is a Stream C implementation of a 5-tap FIR filter such as the filter 500 in FIG. 10 including 10, 20, 30, 40 and 50 as arbitrarily chosen five filter coefficients.

```
stream int UnitDelay(int X)
{
    out = X;
    out.initialize(0);
}
stream (int xOut, int yOut) tap(int xIn, int yIn, int h)
{
    xOut = UnitDelay(xIn);
    yOut = yIn + h*xOut;
}
stream int FIR5(int X)
{
    (int x2, int y2) = tap(X, 10*X, 20);
    (int x3, int y3) = tap(x2,  y2, 30);
    (int x4, int y4) = tap(x3,  y3, 40);
    (int  , out  ) = tap(x4,  y4, 50);
}
```

This implementation exhibits concurrency but does so without any explicit concurrency constructs. The concurrency simply falls out from code that, except for the multiple, named outputs of tap, resembles ordinary sequential code. In place of variables, there are now streams.

Each of the four instantiations of tap within the body of FIR5 is computing its own copy of the formula

*y*In+*h*\**x*Out concurrently with the three other instantiations of tap. That is made possible by the opportunistic nature of stream expressions and by the continuing arrival of new input values to each of the instantiations of tap. Those new values are supplied by seven internal streams of FIR5.

X conveys values from the input of FIR5 to inputs of the first tap x2 and y2 convey values from outputs of the first tap to inputs of the second tap x3 and y3 convey values from outputs of the second tap to inputs of the third tap x4 and y4 convey values from outputs of the third tap to inputs of the fourth tap The h input of each instantiation of tap is replaced by a constant. That causes the Stream C compiler to replace all instances of h within a tap instantiation with the constant. All of the computations performed by the instantiations of tap are in service to the transformation of FIR5 input values into FIR5 output values. Those final output values are supplied by the default output stream of FIR5.

out conveys values from an output of the fourth tap to the output of FIR5

This implementation is an example of how many digital-signal-processing functions are dealt with in Stream C.

In the FIR-filter example above, the five coefficients, 10, 20, 30, 40, 50, are known at compile time. However, if the FIR5 coefficients aren't known at compile time or if the coefficients, although constant for extended periods, do change from time to time, another technique needs to be employed. In such a case, these quasi-constants are not true constants because they do change, and they are not true streams because their values are not consumed (popped from a FIFO queue) by a stream expression or by a thread.

A quasi-constant stream is similar to an ordinary stream in several respects. It has a type, one or more sources, one or more destinations and a name. It conveys values of the specified type from the specified sources to the specified destinations. However, a quasi-constant stream differs from an ordinary stream in several ways. Where an ordinary stream would have a FIFO queue, a quasi-constant stream has storage for one value of the specified type (much like the storage associated with a variable). The value residing in that storage is neither popped nor consumed when accessed by a stream expression or thread, but instead remains resident in storage. The stored value is updated when a new value enters the stream through one of the stream sources. When that happens, the new value simply overwrites the old value. Because this updating is typically done asynchronously with system operation, the point at which the update is recognized at the stream destination is, in general, indeterminate. The declaration of a quasi-constant stream must specify an initial value to be stored at each stream storage location at system initialization.

A quasi-constant stream is declared, either in a standalone declaration or in the input or output parameter list of a module, using the following syntax.

const<stream-type><stream-identifier>=<initial-value>

The existing C keyword const, which ordinarily applies only to variables, indicates that the stream being declared is a quasi-constant stream. (The use of const saves having to introduce a new keyword).

These ideas are illustrated in the following modification of the FIR5 module. Here, the five coefficients 10, 20, 30, 40 and 50 of the original example have been replaced by the five quasi-constant streams h0, h1, h2, h3 and h4. Since the initial values inserted into these streams at system initialization are the same as the original coefficients, the new FIR5 starts operation with the same coefficients as the original. With the new FIR5, however, those coefficients may be updated if conditions warrant.

```
stream int FIR5(int X,       const int h0 = 10,
                             const int h1 = 20,
                             const int h2 = 30,
                             const int h3 = 40,
                             const int h4 = 50 )
{
    (int x2, int y2) = tap(X, h0*X, h1);
    (int x3, int y3) = tap(x2,  y2, h2);
    (int x4, int y4) = tap(x3,  y3, h3);
    (int  , out  ) = tap(x4,   y4, h4);
}
```

Figure 11A:
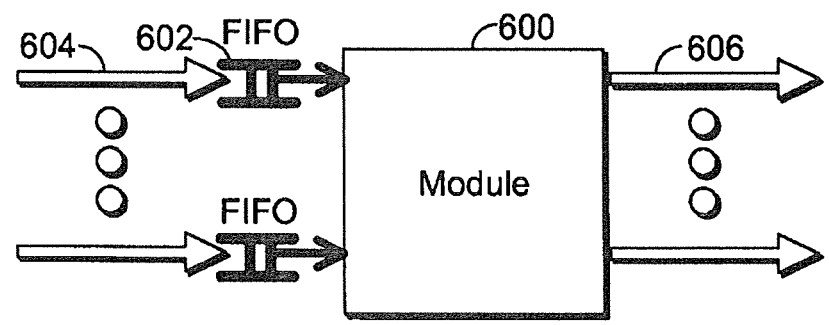
FIGS. 11A-C are modules with various configurations of FIFO.
Figure 11B:
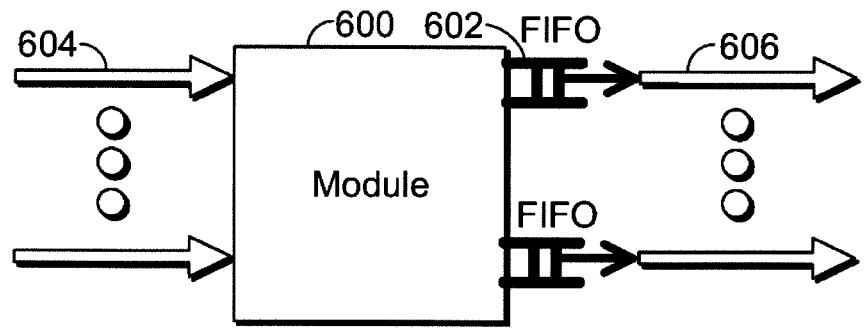
Figure 11C:
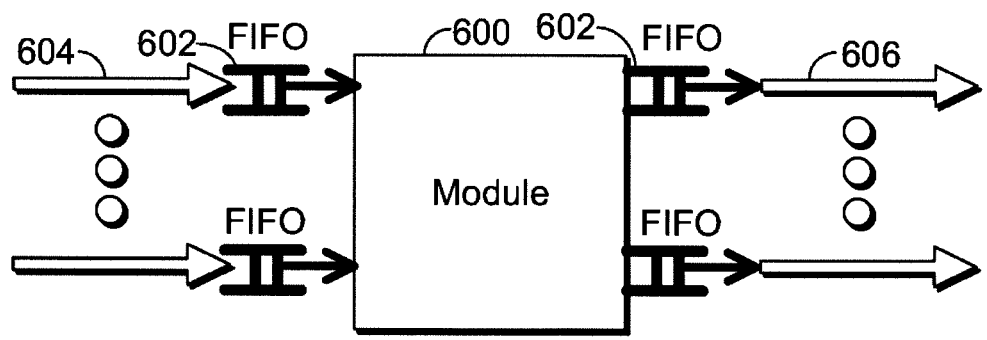

FIG. 11A shows a module 600 highlighting a series of FIFO buffers 602 on an input stream 604. FIGS. 11B and C show two additional alternative implementations of the use of the FIFO buffers 602 and the module 600. FIG. 11B shows the use of a FIFO buffer 602 on a series of output streams 606 only. FIG. 11C shows the use of the FIFO buffers 602 on both the input and output streams 604 and 606. From a programmer's perspective the three diagrams in FIGS. 11A-C are identical. From a performance viewpoint having both buffering on input and output as in FIG. 11C allows the module 600 to be scheduled for execution without regard to space being available on the module 600 that is receiving the stream. This does come at a cost of additional memory and an extra scheduling step. The FIFO buffers 602 may reside in virtual memory space, physical memory space, and register file space depending on the implementation.

An example of a high level scheduling algorithm for the input stream FIFO as in FIG. 11A is as follows.

```
a. Schedule a Module for Execution when {
    There is data available in the input FIFO of
    the input stream(s)
    AND
    There is space available in input stream FIFO
    of the module connected to the current modules
    output stream
    }
```

An example of a high level scheduling algorithm for the output stream FIFO as in FIG. 10B is as follows

```
b. Schedule a Module for Execution when {
    There is data available in the output stream
    FIFO of the module connected to the current
    modules input stream(s)
    AND
    There is space available in FIFO of the output
    stream(s)
    }.
```

An example of a high level scheduling algorithm for input and output stream FIFO as in FIG. 10C is as follows:

```
c. Schedule a Module for Execution when {
    There is data available in the input FIFO of
    the input stream(s)
    AND
        (There is space available in input stream
        FIFO of the module connected to the current
        modules output stream
```

```
        OR
        There is space available in FIFO of the
        output stream(s))
}
```

Threads

Threads provide capabilities crucial to making Stream C a complete and well-rounded language. Threads may appear either within the body of a C function (i.e., a function whose inputs are individual values and whose output is a single value) or within the body of a module (i.e., a function whose inputs and outputs are streams of values). The two types of threads are identical except that threads in the body of a module may, and usually do, access Stream C streams, and for that reason they usually do not terminate. Also, threads in the body of a C function do not access Stream C streams, and like all (well-behaved) C threads they do terminate.

The distinguishing characteristic of a Stream C thread is its complete decoupling from concurrency issues. There are no concurrency constructs, no direct interactions with other threads and no spawning of new threads. A Stream C thread is thus oblivious to the fact that, in general, it is operating in a multi-threaded environment. A programmer working in the thread domain can therefore focus on a strictly sequential problem.

Function declarations and function definitions in Stream C have the same syntax and semantics as their counterparts in C. For a function call in Stream C, the syntax and semantics depend upon whether the call appears in: (a) the body of a function or (b) a stream expression. A Stream C function call in the body of the same (recursive) function or the body of another function has the same syntax and semantics as a regular C function call. A Stream C function call in a stream expression has the same syntax as a C function call but with streams replacing variables in the function-call arguments. The semantics of such a call are similar, but not identical, to those of a regular function call. The differences relate to how each evaluation (call) of the function is performed. More specifically, they concern: (1) how values are obtained for the parameters (streams) appearing in the function-call arguments, (2) the destination of the function-call output, and (3) how control is handled.

In C, the parameters appearing in the arguments of a function call are all variables, and the value substituted for each such function input variable is the current value of that variable. In Stream C, the parameters appearing in the arguments of a stream-expression function call are all streams, and the value substituted for each such function input stream is either: (a) the value popped (consumed) from the FIFO queue at that stream destination, in the case of a regular stream, or (b) the current value at that stream destination, in the case of a quasi-constant stream.

In C, the value returned by a function call is passed to the caller. In Stream C, the value returned by a stream-expression function call is placed into the function-call output stream, which may be either named or unnamed. As a stream expression itself, a stream-expression function call always has an output stream. The destinations of the output value are determined by the destinations of the stream.

In C, a function is called when the thread of control encounters a call to that function. In Stream C, a stream-expression function call is evaluated (i.e., the function is called), without regard to a thread of control. Instead the function is called opportunistically whenever there is at least one value in the FIFO queue of each regular input stream of the function call. Quasi-constant input streams are always prepared to supply a value, and so they never block a function call or evaluation of a stream expression.

Apart from these three differences, the semantics of regular C function calls and stream-expression function calls are identical. That means that in both cases, the usual thread-based semantics applies to function execution.

An example of threads in C Stream may be shown with the following definitions of the function GCD and the module GCD4.

```
    int GCD(int a, int b)                      // A recursive
function
    {
        if ((a >= b) && ((a % b) == 0))        // Beginning of a
thread
        {
            return (b);
        }
        if (a < b)
        {
            return GCD(b, a);                  // A function call
        }
        return GCD(b, (a % b));                // A function call
    }
    stream int GCD4(int w, int x, int y, int z)  // A module
    {
        out = GCD(GCD(w, x), GCD(y, z));       // A stream
expression with
    }                                          // three function
calls
```

GCD, a classic example of a recursive function, returns the greatest common divisor of two integers. It has two integer inputs, a and b, and returns an integer result. GCD4, is a module with four integer-stream inputs, w, x, y and z, and an integer-stream output. Within the body of GCD4, is the stream-expression statement out=GCD(GCD(w,x),GCD(y,z));

and within this statement is the stream expression

GCD(GCD(w,x),GCD(y,z))

Figure 12:
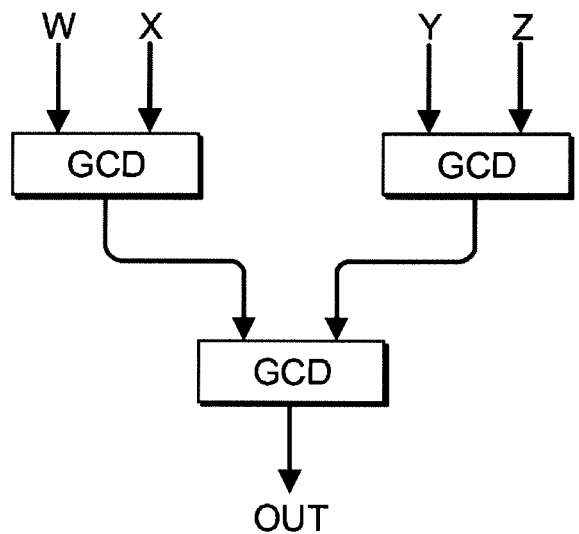
FIG. 12 is a flow diagram of threads used in the example programming language.

Since this expression contains the destinations of streams w, x, y and z, there is a FIFO queue at each of those four destinations. Those queues permit the function calls GCD(w, x) and GCD (y, z) to be evaluated (executed) opportunistically and concurrently as described above. Like these two calls, the third call to GCD is performed opportunistically with input values being obtained from the FIFO queues of its two input streams. Those input streams originate as the output streams of the two other calls to GCD, the FIFO queues on those two streams allowing the third call to GCD to be performed concurrently with the first two. The output stream of this third function call is directed by means of the stream assignment to out, the output stream of GCD4. This arrangement of function calls to GCD, which is represented as a data-flow graph in FIG. 12, allows data from the four input streams, w, x, y and z, to be streamed through the three concurrently operating function calls to produce a stream of output values, each of which is the greatest common divisor of w(i), x(i), y(i) and z(i), for some integer i≥0.

From the stream point of view, it's immaterial how a module transforms input stream values into output stream values. All that matters are the transformation(s) from inputs to outputs (and any side effects). In the examples presented so far, these transformations have been represented in terms of stream expressions, expressions which may be implemented using application-specific hardware, reconfigurable hardware (such as that in FIGS. 1 and 2), a processor executing sequential code or some other mechanism.

These transformations may be represented explicitly as sequential code residing in the body of a module. Such code executes on a stored-program sequential processor, and exists in what may be referred to as the thread domain. Although the body of a module will typically contain statements exclusively in either the stream domain or the thread domain, that does not preclude the presence of both types of statements in the same module body. In that case, the two domains operate side by side (i.e., concurrently).

The syntax and semantics of the thread domain are a superset of C as defined informally by Brian W. Kernighan and Dennis M. Ritchie, "C Programming Language," (1978) and formally by the ISO C standard ISO/IEC 9899. The additions to standard C involve operations that allow a thread to access those streams that are visible to the thread, either module input streams, module output streams, streams internal to the module body or global streams. Those stream-access operations are divided into two categories: blocking and non-blocking. To understand those operations, the mechanisms used to regulate the flow of values in streams and the mechanisms for managing tasks (a task is equivalent to a module instance) are significant as described above with reference to the node wrapper in FIG. 4.

Flow control and task management are key services provided by the Stream C run-time-support system. Flow control prevents FIFO queue overflow (i.e., the writing of data to a queue that is already full) and FIFO queue underflow (i.e., the reading of data from a queue that is empty). Task management controls when tasks are placed into execution and, in some cases, when task execution is terminated. There are three key elements of the Stream C flow control and task management systems: consumer counts, producer counts, and task managers.

An integer consumer count is associated with each FIFO queue of a regular (non quasi-constant) stream. All reads by a particular thread of a particular stream access the same FIFO queue and, therefore, the same consumer count. The consumer count sign bit indicates whether the FIFO queue is empty. A sign bit of 1 (the consumer count is negative) indicates that the queue is empty. A sign bit of 0 (the consumer count is non-negative) indicates that the queue is nonempty.

An integer producer count is associated with each source of each regular (non quasi-constant) stream. The producer count sign bit indicates whether there is space available in all downstream FIFO queues to receive a value inserted at this stream source. A sign bit of 0 (the producer count is non-negative) indicates that not all downstream queues have space to receive a value this output stream. A sign bit of 1 (the producer count is negative) indicates that all downstream queues have space to receive a value this output stream.

Each processing core such as the nodes 180 in FIG. 2 has a first-in-first-out ready-to-run queue of tasks that have all the resources, including input data, required to begin execution. Each processing core has a task manager responsible for managing the execution of tasks and providing the necessary coordination signals between tasks. A task manager automatically increments the consumer count when data is pushed onto (written to) a FIFO queue, decrements the consumer count when data is popped (consumed) from a FIFO queue, sends backwards acknowledgements to stream sources to indicate that space has become available at destination FIFO queues (the default is to send a backwards acknowledgement after each value is consumed from each FIFO queue). The task manager also increments the producer count of a module output stream when data is written to that steam, decrements the producer count of a module output stream when a backwards acknowledgement is received for that stream, and places a task in the processing core's ready-to-run task queue when the task has the input data, and any other required resources, it needs to proceed. The task manager places a task into execution when the task is at the head of the ready-to-run task queue and there is an execution unit available and suspends execution of a task when the task does not have the input data it needs to proceed or when the task times out.

Blocking stream-access operations allow a thread appearing in a module body to access streams visible to the thread such as module input streams, module output streams, streams internal to the module body and global streams. These are the preferred methods for accessing streams because, unlike their non-blocking brethren, they introduce no non-determinism. The blocking and unblocking of such operations is handled automatically by a processing core's task manager.

There are three such operations, each patterned after a similar operation in C++. The >> operator is used to pop (consume) a single value from a stream FIFO queue and assign that value to a variable. It is used in statements of the form <stream-identifier>>><variable-identifier>;

The statement causes a single value to be popped from the stream on the left and assigned to the variable on the right. If, however, the FIFO queue for the stream is empty as indicated by the sign bit of the stream's consumer count, the statement blocks (stalls) and remains blocked until queue becomes nonempty again, as indicated by the sign bit of the stream's consumer count.

The <<operator is used to place the current value of a variable into a stream. It is used in statements of the form <stream-identifier><<<variable-identifier>;

The statement causes the current value of the variable on the right to be placed into the stream on the left. If, however, one or more downstream queues do not have space to receive such a value, as indicated by the sign bit of producer count at the stream source, the statement blocks (stalls) and remains blocked until all downstream queues have space to receive the value again, as indicated by the sign bit of the stream's producer count.

The peek operator is used to obtain the value at the head of a stream FIFO queue without popping (consuming). It is used in expressions of the form <stream-identifier>.peek( )

This expression returns the current value at the head of the FIFO queue of <stream-identifier>, but does not pop (consume) that value from the queue. If, however, the FIFO queue for the stream is empty as indicated by the sign bit of the stream's consumer count, the statement blocks (stalls) and remains blocked until queue becomes nonempty, again, as indicated by the sign bit of the stream's consumer count.

Like their blocking cousins, non-blocking stream-access operations allow a thread appearing in a module body to access streams visible to the thread such as module input streams, module output streams, streams internal to the module body and global streams. However, unlike blocking operations, non-blocking operations typically involve race conditions that affect the outcome of the operations and therefore introduce non-determinism. There are two such operations:

An expression of the form

<stream-identifier>.consumerCount( )

returns the consumer count of <stream-identifier>, where <stream-identifier> is a stream that is read by the thread via the >> or peek operations. This expression is used primarily to test the consumer-count sign bit of <stream-identifier> in order to bypass a >> or peek operation when the FIFO queue of <stream-identifier> is empty.

An expression of the form

<stream-identifier>.producerCount( )

returns the producer count of <stream-identifier>, where <stream-identifier> is a stream that is written to by the thread via the <<operation. This expression is used primarily to test the producer-count sign bit of <stream-identifier> in order to bypass a << operation when one or more downstream queues do not have space to receive such a new value.

While threads within module bodies may take many different forms, many will be variations of the following typical form.

```
stream int moduleA(int strm1, ..., int strmN)
{
    int var1, ..., varN, result;      // Declare variables
    while true                         // Loop forever
    {
        strm1 >> var1;
                .
                .                      // Read values from input
        streams
                .
        strmN >> varN;
                .
                .                      // Compute result
                .
        out << result;                 // Place result into output
    stream
    }
}
```

Here, moduleA is a module with one or more input streams and a single output stream. The input and output stream types are arbitrary chosen to be integers. The first thing the thread within the body of moduleA does is declare a variable for each input stream and a variable for the single output stream. The thread then enters an infinite loop in which each iteration involves: (a) reading in (consuming) a value from each input stream, (b) computing (producing) a result and (c) placing that result into the output stream.

Arrays

As in other languages, arrays play an important role in Stream C, but not just arrays of data elements, but also stream arrays and module arrays. Arrays of actual data values (not pointers to arrays of data values) are conveyed concurrently over multiple streams. Stream arrays are especially valuable when used in conjunction with arrays of modules.

Stream C inherits its syntax and semantics for data arrays from C. That means that when the name of an array is used as (a function) argument, the value passed to the function is the location or address of the beginning of the array, there is no copying of array elements. The same is true for the stream inputs (arguments) and outputs of a module. To illustrate, the GCD4 module from above may be used.

```
stream int GCD4(int w, int x, int y, int z)    // A module
with four
    {                                           // integer
arguments
        out = GCD(GCD(w, x), GCD(y, z));
    }
```

Instead of supplying GCD4 with four separate integer-stream arguments, it is supplied with a single stream argument in which each value is an array of four integers. GCD4 would then be transformed into:

```
stream int GCD4(int* wxyz)                     // A module
with one
    {                                           // array
argument
        out = GCD(GCD(wxyz[0], wxyz[1]), GCD(wxyz[2], wxyz[3]));
    }
```

In accordance with C conventions, the single argument of GCD4 is of type int*, that is, a pointer to an integer, and in this case, the first integer in an array of four integers. Those four integers are accessed within the body of GCD4 using the standard C operator [ ]. Supplying C-type data arrays to a module is one way to deal with arrays in the context of streams.

For some applications, supplying a module with a stream of array pointers is insufficient to fully exploit the concurrency inherent in the application. An array of streams, rather than a stream of arrays therefore permits arrays of actual data values, not pointers to arrays of data values, to be conveyed concurrently over multiple streams. Declaring a stream array is identical to declaring a regular C array, with two differences, the keyword stream precedes declaration and the size of the array must be known at compile time. This restriction is necessary since, like modules, all streams within an application are instantiated at compile time.

Examples of stream-array declarations are:

```
stream int array1D[4];
stream int array2D[4][16];
stream int array3D[4][16][9];
```

The first declaration declares array1D to be a one-dimensional array of 4 integer streams. Similarly, array2D is declared to be two-dimensional array of 64 integer streams, and array3D a three-dimensional array of 576 integer streams. Individual streams of a stream array are accessed in the same way as individual elements of a data array. For example, array3D[3][15][7]

denotes one of the 576 streams in array3D.

Once a stream array is declared, the entire array, subarrays of the array or individual streams within the array may be referenced. These three cases are illustrated in the following code fragment.

```
    stream int moduleA(int);                    // A module
declaration
    stream int moduleB(int[4]);                 //   "    "
    stream int moduleC(int[3][4]);              //   "    "
    stream int moduleD(int W[3][4])             // A module
definition
    {
        .
        .
        .
        stream int X = moduleA(W[2][0]);        // A stream
statement
        stream int Y = moduleB(W[2]);           //   "    "
        stream int Z = moduleC(W);              //   "    "
        .
        .
        .
    }
```

Here, declarations for moduleA, moduleB and moduleC, and a partial definition of moduleD are shown. The input types of the four modules are:

| Module | Input Type |
| --- | --- |
| moduleA(int) | A single integer stream |
| moduleB(int[4]) | A 1-dimensional array of 4 integer streams |
| moduleC(int[3][4]) | A 3 × 4 array of integer streams |
| moduleD(int[3][4]) | A 3 × 4 array of integer streams |

The input arguments supplied to the instantiations of moduleA, moduleB and moduleC within the body of moduleD are as follows.

| Module Instantiation | Argument | Argument Type |
| --- | --- | --- |
| moduleA(W[2][0]) | W[2][0] | A single integer stream |
| moduleB(W[2]) | W[2] | A 1-dimensional array of 4 integer streams |
| moduleC(W) | W | A 3 × 4 array of integer streams |

In each case, the module-instantiation argument type matches the module input type, and each module instantiation therefore satisfies the strong-typing requirement of Stream C.

Accessing individual streams of a stream array within a stream expression is also straightforward, as illustrated in this example of a complex-multiply module.

```
    stream int[2] complexMult(int X[2], int Y[2])
    {
        out[0] = X[0]*Y[0] − X[1]*Y[1];
        out[1] = X[0]*Y[1] + X[1]*Y[0];
    }
```

Because operators within stream expressions are concurrently active, the four multiplies, one addition and one subtraction in the stream expressions X[0]*Y[0]−X[1]*Y[1] and X[0]*Y[1]+X[1]*Y[0] are evaluated concurrently.

Data parallelism, one of the more popular approaches to parallel processing, is a form of parallelism in which the same task is performed concurrently (in parallel) on different pieces of the same data structure, which is typically an array. In Stream C, data parallelism is supported by module arrays.

A module array is, as its name implies, an array of modules. It is declared by inserting the array dimensions, in square brackets, between the module name and the list of inputs parameters. The following are two examples of module-array declarations:

```
    stream int moduleA[3][4](int, int);
    stream (int, int) moduleB[3][4](int, int);
```

In both cases, the array dimensions are 3×4.

Like the definition of an ordinary (standalone) module, the definition of a module array has a body delimited by curly braces ({ and}). The following are two examples of module-array definitions. The first has a single (default) output stream, while the second has two named output streams.

```
    stream int moduleA[3][4](int a, int b)
    {
        // Module Body
    }
```

-continued

```
    stream (int x, int y) moduleB[3][4](int a, int b)
    {
        // Module Body
    }.
```

Once a module array is declared (either in a declaration or a definition), the entire array, subarrays of the array or individual modules within the array may be instantiated within a stream statement in the same manner as data arrays and stream arrays. These three cases are illustrated here for moduleA[3][4].

| Instance | | Instantiations |
| --- | --- | --- |
| moduleA[2][0] | | An individual module instantiation |
| moduleA[2] | (style 1) | A 1-dimensional array of 4 module instantiations |
| moduleA[2][ ] | (style 2) | A 1-dimensional array of 4 module instantiations |
| moduleA | (style 1) | The entire 3 × 4 array of module instantiations |
| moduleA[ ][ ] | (style 2) | The entire 3 × 4 array of module instantiations |

The key attribute of a module array comes to the fore when the array is instantiated at system initialization. Each element of a module array is instantiated as a separate module instantiation, thereby permitting all array elements to operate concurrently. ModuleA[3][4] is an example of this concept. When the module is instantiated, 12 (=3×4) separate instantiations of moduleA are created, each operating concurrently with the 11 other instantiations. Furthermore, this multiplication of instantiations applies to each instance of moduleA[3][4]. Thus if there are three instances of moduleA[3][4], then 36 (=3×12) separate instantiations of moduleA are created.

The personalization of a module-array instantiation determines what data the instantiation operates upon. The instantiation may be personalized by supplying each module instantiation with its own unique data through the instantiation's input streams. The instantiation may also be personalized by allowing each module instantiation to identify its array indices using the index operator, thereby enabling the instantiation to access its own unique part of a global array.

The first type of personalization is illustrated below, where the stream arrays may be used to supply unique data to each element of a module array. The second type of personalization exploits the fact that the array indices of each array-module instantiation are known at compile time. To access those indices, the programmer uses an operator with the following syntax:

int index(int i)

where i is an integer expression that evaluates to a constant at compile time. At compile time, index (i) is replaced the $i^{th}$ index of the instantiation. A compile-time or run-time error occurs if i is outside array bounds.

Stream arrays and module arrays find their greatest utility when they are coupled using a special array-coupling feature of Stream C. There are three requirements for a coupling: a) the stream array and module array must have the same dimensions; b) the stream array must be connected (coupled) to a module-array input or output; and c) the stream-array type must match the module input/output type.

When such a coupling occurs, each individual stream in the stream array is connected (coupled) to the input/output stream of the individual module in the module array with the same indices. Thus, if the stream array $S[D_1][D_2] \ldots [D_n]$ is coupled to an input/output of the module array $M[D_1][D_2] \ldots [D_n]$, then each individual stream $S[i_1][i_2] \ldots [i_n]$ is connected to an input/output of the individual module $M[i_1][1_2] \ldots [i_n]$ for $0 \le i_1 < D_1$, $0 \le i_2 < D_2 \ldots 0 \le i_n < D_n$.

The following is an example of a stream array coupled to the output of one module array and the input of another module array:

```
stream int moduleA[3][2]( );          // First coupled module
stream void moduleB[3][2](int);       // Second coupled module
stream void parentModule( )
{
      stream int cStrm[3][2];          // The coupled stream
      cStrm[ ][ ] = moduleA[ ][ ]( );  // moduleA output coupled to
cStrm
      moduleB[ ][ ](cStrm[ ][ ]);      // cStrm coupled to moduleB
input
}
```

Here, the output stream of moduleA[3][2] is coupled to cStrm[3][2], and cStrm[3][2] is coupled to the input stream of moduleB[3][2]. The two couplings are legal because:
   cStrm[3][2], moduleA[3][2] and moduleB[3][2] all have the same dimensions.
   cStrm[3][2] is connected to an output of moduleA[3][2] and an input of moduleB[3][2].
   The type of cStrm[3][2], the output type of moduleA[3][2] and the input type of moduleB[3][2] are all int.

The following table lists for each individual stream in cStrm[3][2]: (a) the module whose output is the stream source, (b) the individual stream in cStrm[3][2] and (c) the module whose input is the stream destination.

| Stream Source | Stream | Stream Destination |
| --- | --- | --- |
| moduleA[0][0] | cStrm[0][0] | moduleB[0][0] |
| moduleA[0][1] | cStrm[0][1] | moduleB[0][1] |
| moduleA[1][0] | cStrm[1][0] | moduleB[1][0] |
| moduleA[1][1] | cStrm[1][1] | moduleB[1][1] |
| moduleA[2][0] | cStrm[2][0] | moduleB[2][0] |
| moduleA[2][1] | cStrm[2][1] | moduleB[2][1] |

Pings

There are situations when a module needs to notify another module that a particular operation, a side effect, performed by the module has been completed. For example, when a module performs an operation on a data structure in global memory, perhaps as one of many modules performing similar operations on the same data structure, that module typically needs to notify a downstream module that the operation has been completed so that a downstream operation or task may be initiated. In these situations, there is no need to return a value, just a signal that a particular task has been completed. For these situations where a signal, but no value, is needed, Stream C provides the ping data type. Pings (values of type ping) are featureless and completely indistinguishable from one another.

Pings are used in conjunction with three operators: (1) the join operator to provide synchronization of tasks, (2) the >> stream-access operator and (3) the <<stream-access operator. The first use involves just streams, while the last two uses involve a stream and a thread.

The ping keyword is used to declare one or more streams of type ping. For example, the following statement declares that pStrm0, pStrm1 and pStrm2 are streams of type ping:
   stream ping pStrm0, pStrm1, pStrm2;
The ping keyword is also used in a module prototype/definition to declare that a module input or output stream is of type ping, as in:
   stream ping moduleName(int, ping);.

The first use of pings involves the join operator, which serves to join a ping stream with one or more other streams to produce a single output stream. This operator is similar to the rendezvous operation found in some other computing models. Expressions containing the join operator take one of two forms:

```
<pingStreamArray>.join( )
<pingStream>.join(<streamExpression>)
```

As with all stream expressions, each evaluation of an expression in one of these forms consumes a single value/ping from each input stream and produces a single value/ping on the expression's (unnamed) output stream. If an input stream is empty (devoid of values), evaluation stalls (blocks) until all input streams have at least one value/ping. There is no need for an explicit join operation for non-ping expressions since the effect of a join operation is already subsumed by the semantics of expression evaluation.

When an expression of the first type is evaluated, a single ping is consumed from each stream in the array of ping streams, and a single ping is emitted on the expression's output stream.

An evaluation of an expression in the second form entails the consumption of a single ping from <pingStream> and the evaluation of <streamExpression>. The stream expression <streamExpression> may be of arbitrary type, including ping. The value that results from the evaluation of <streamExpression> is emitted on the output stream of the join operation. If the expression is of type ping, the expression evaluates to a single ping. The ping stream thus acts as a gatekeeper—much like the >> operation described above, allowing an evaluation to proceed only when a ping is present in <pingStream>.

Figure 13A:
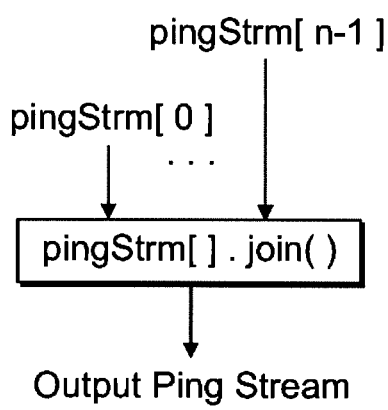
FIG. 13A-B are diagrams of forms of the join operation of the example programming language.
Figure 13B:
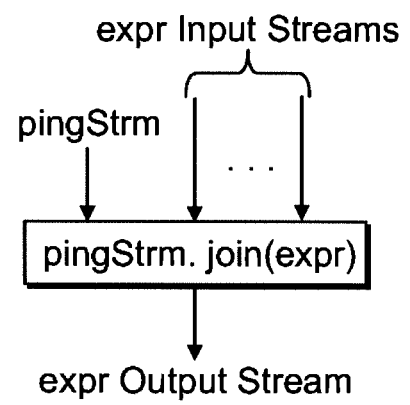

The two forms of the join operation are represented graphically as shown in FIGS. 13A and 13B. In FIG. 13A, the individual streams of pingStrm[ ], a one-dimensional ping-stream array of size n, are joined to produce a single (unnamed) output ping stream. In FIG. 13B, a single ping stream, pingStrm, is joined with the expression expr to produce a single (unnamed) output stream of the same type as expr.

One example of the join operation may include a Data Structure X on which two operations, Operation A and Operation B, are performed. These operations meet the following requirements: a) neither Operation A nor Operation B is performed except in response to a go signal; b) when a go signal is received, Operation A and Operation B are performed concurrently; and c) before either Operation A or Operation B can be initiated, both operations performed in response to a preceding go signal must be completed.

A simple solution to this problem employs two instances of the join operator:

```
stream ping moduleA(ping pStrm)
{
    while (true)
    {
        pStrm >> ping;
        // Perform Operation A on Data Structure X
        out << ping;
    }
}
stream ping moduleB(ping pStrm)
{
    while (true)
    {
        pStrm >> ping;
        // Perform Operation B on Data Structure X
        out << ping;
    }
}
stream ping moduleC(ping goStrm)
{
    stream ping startStrm = goStrm.join(doneStrm);
    stream ping StrmA = moduleA(startStrm);
    stream ping StrmB = moduleB(startStrm);
    stream ping doneStrm = StrmA.join(StrmB);
    doneStrm.initialize(ping);
    out = doneStrm;
}
``` moduleA and moduleB encapsulate Operation A and Operation B, respectively. Each has an input ping stream, which initiates one operation per ping, and an output ping stream, which confirms completion of one operation per ping. moduleC contains one instance of both moduleA and moduleB, and receives go signals via the goStrm input ping stream.

The six statements in moduleC play the following roles:
stream ping startStrm=goStrm.join(doneStrm);
joins goStrm and doneStrm to produce startStrm. A ping is thus placed into startStrm when there is a ping on goStrm (i.e., a go signal) and a ping on doneStrm, which, indicates completion of A and B operations performed in response to the preceding go signal.
stream ping StrmA=moduleA(startStrm);
connects startStrm to the input ping stream of moduleA, and connects the output ping stream of moduleA to StrmA. That means that Operation A is performed in response to a go signal, but only after both operations associated with the preceding go signal have been completed.
stream ping StrmB=moduleB(startStrm);
is similar to the preceding statement. It ensures that Operation B is performed in response to a go signal, but only after both operations associated with the preceding go signal have been completed. There are, however, no restrictions on the order in which Operations A and B are performed. In other words, they are performed concurrently.
stream ping doneStrm=StrmA.join(StrmB);
joins strmA, the output ping stream of moduleA, and StrmB, the output ping stream of moduleB. A ping is thus placed onto doneStrm when both operations performed in response to the preceding go signal have been completed.
doneStrm.initialize(ping);
places a single ping into doneStrm at system initialization. This indicates that all previous operations, of which there are none, have been completed. Without this statement, moduleC would deadlock and no operations would ever be performed.
out=doneStrm;
connects doneStrm to out, the default output steam of moduleC. Each ping on this stream confirms that the Operation A and Operation B performed in response to a go signal have been completed. The behavior of moduleC may be summed up as a go signal (ping) on the input port of moduleC causing Operation A and Operation B to be performed concurrently on Data Structure X, but only after previous operations have been completed. When both Operation A and Operation B are completed, moduleC sends a ping on its output port as confirmation.

A statement of the form
pingStrm >> ping;
where pingStrm is a stream of type ping, serves to synchronize execution of a thread with the pings in pingStrm. When the statement is encountered in a thread, a single ping is read (consumed) from pingStrm. If pingStrm is empty (i.e., there are no pings in pingStrm), then the statement blocks (stalls) until a ping becomes available. The statement thus acts as a gatekeeper, allowing a thread to proceed only when a ping is present in pingStrm. There is no variable involved in this operation, on the right of the >> operator, where a variable would ordinarily be expected, is just the keyword ping.

A statement of the form
pingStrm <<ping;
where pingStrm is a stream of type ping, allows a thread to signal interested parties that a certain operation, or operations, have been completed. When the statement is encountered in a thread, a single ping is written to (placed in) pingStrm. Unlike the first statement above, this statement never blocks.

These two forms of stream/thread interaction involving pings are illustrated in the following code fragment:

```
stream ping moduleA(ping pStrm)
{
    // Do initialization before entering loop
    while (true)
    {
        pStrm >> ping;
        // Perform operations with side effects
        out << ping;
    }
}
``` moduleA has a single input port and a single output port, both of type ping. Within moduleA is a thread containing an infinite loop, each iteration of which begins with the statement
    pStrm >> ping;
This statement serves to synchronize the iterations of the loop with the pings in the module input stream pStrm. It blocks when pStrm is empty and consumes a single ping from pStrm when pStrm is non-empty. Following that statement are statements associated with an activity that invariably involves side effects. If there were no side effects, moduleA would be equivalent to a no-op. At the end of each iteration is the statement
    out <<ping;
which signals through moduleA's standard output port that another loop iteration has been completed.

The join operator is useful when working entirely within the stream domain. There may be situations, however, in which it is more convenient to do the join within a thread. Consider, for example, joining the individual streams of
    stream ping pingStrm[32];
within a thread. That can be accomplished by embedding a for loop within a thread:

```
for (int i = 0; i < 32; ++i)
{
    pingStrm[i] >> ping;
}
```

This loop blocks a thread until one ping has been consumed from each of the 32 streams in pingStrm. An output stream corresponding to the output stream of pingStrm[ ].join( ) is produced by following the for loop with the statement
    joinStrm <<ping;
To create a module that mimics the behavior of pingStrm[ ].join( ), these two code fragments are embedded in a while (true) loop, and the loop is placed in a module:

```
stream ping joinArray(ping pingStrm[32])
{
    while (true)
    {
        for (int i = 0; i < 32; ++i)
        {
            pingStrm[i] >> ping;
        }
        out << ping;
    }
}
```

A module with embedded thread may be used to mimic the behavior of pingStrm.join(expr), where expr is an expression. In this case, however, the module needs an input stream not only for pingStrm, but also for each input stream of expr. So, for example, if expr is the expression X*Y+Z, where X, Y and Z are integers, then the module that implements pingStrm.join(expr) looks like:

```
stream ping joinExpr(ping pingStrm, int X, int Y, int Z)
{
    while (true)
    {
        pingStrm >> ping;
        out << X*Y + Z;
    }
}
```

A pixel-processing example illustrates the use of pings, stream arrays and module arrays in implementing data parallelism, a form of parallelism in which the same task is performed concurrently (in parallel) on different pieces of the same data structure such as an array. The example consists of a module array and a module.

```
extern int xScaleFactor, yScaleFactor;
stream ping doPixel[64][256](int* baStrm)         // Body is in
the
    {                                              // thread
domain
        const int x = xScaleFactor * index(0);
        const int y = yScaleFactor * index(1);
        int* baseAddress;
        while true
        {
            baStrm >> baseAddress;
                .                                  // Perform computations on
                .
                .                                  // baStrm[x][y] and
neighbors
            out << ping;
        }
    }
stream void parentModule(int* baStrm)              // Body is in
the
    {                                              // stream
domain
        stream ping xStrm[64][256];
        stream ping jStrm;
        jStrm.initialize(ping);
        xStrm[ ][ ]       = doPixel[ ][ ](jStrm.join(baStrm));
        jStrm             = xStrm[ ][ ].join( );
    }
```

The two-dimensional module array, doPixel[64][256], is sized to match the size of a two-dimensional array of pixels. The base addresses of the pixel arrays on which doPixel[64][256] operates are supplied by the input stream baStrm. The x coordinate of the pixels upon an individual doPixel module operates is obtained by multiplying index(0), the x index of the individual doPixel module (see Section 5.3), by the global constant xScaleFactor. The y coordinate of the pixels upon an individual doPixel module operates is obtained by multiplying index(1), the y index of the individual doPixel module, by the global constant yScaleFactor. The processing of each pixel begins by setting the variable baStrm to the current value in baStrm. What follows are computations performed on baStrm[x][y] and its neighbors. When processing is done, the individual doPixel module signals completion by emitting a ping.

The parentModule is responsible for broadcasting pixel-array base addresses to the individual modules in doPixel [64][256]. This is done via the statement:
    xStrm[ ][ ]=doPixel[ ][ ](jStrm.join(baStrm));
Here, the expression jStrm.join(baStrm) in the input argument list of doPixel acts as a gate, allowing a value in baStrm to pass only when there is a ping in jStrm. An initial ping inserted into jStrm by the statement
   jStrm.initialize(ping);
allows the very first base address to pass unimpeded. After that, pings are inserted into jStrm by the statement
   jStrm=xStrm[ ][ ].join( );
where xStrm[64][256] is the array of ping streams produced by the individual modules in doPixel[64][256]. A new ping is therefore inserted into jStrm only when all modules in doPixel[64][256] have signaled completion of their previous computation by emitting a ping. This ensures that all computations on a pixel array are completed before computations on the next array are begun.

There is a significant advantage to using pings rather than a standard C data type. With a C data type, a first-in-first-out queue (FIFO) is needed for data values at every destination of a C-data-type stream, that is, everywhere that the stream is an input to an expression. But because pings are indistinguishable from one another, all that is needed at each destination of a ping stream is a counter to tell the number of pings queued up. This results in a significant cost savings over a first-in-first-out queue for data values.

Pragmas are directives to the Stream C compiler/linker/loader. The directive #pragma InitializeCount(m, p, n) initializes the consumer/producer count of input/output port p of module m to n. The Pragma must immediately follow the module definition #pragma FwrdsAckValue(m, s, n). This definition specifies n as the forwards acknowledgement value for the point-to-point connection starting at output stream s of module m. The Pragma must immediately follow the module definition #pragma BwrdsAckValue(m, s, n) specifies n as the backwards acknowledgement value for the point-to-point connection starting at output stream s of module m. The Pragma must immediately follow the module definition.

Some example benefits of the above described concepts are support of threads and multi-threading i.e., the concurrent execution of multiple threads. Also, all forms of parallelism are expressible such as SIMD, MIMD, Instruction-Level, Task-Level, Data-Parallel, Data-Flow, and Systolic. Deterministic behavior is the default. Non-determinism is explicitly added to programs, and only where needed, as it is in sequential programming which makes software testability and reliability more efficient. The concepts described above have no explicit parallelism constructs. Parallelism falls out from code in the stream domain that—syntactically, at least—resembles ordinary sequential code. A programmer working in the thread domain can therefore focus on a strictly sequential problem. The programming model lends itself to model-based design and model-based testing and scales to an arbitrary number of processing cores. The programming model is equally applicable whether the distances separating processing cores are measured in nanometers or thousands of kilometers. There are no foreground or background tasks, just tasks, and there are no interrupts or message passing, just streams.

Although the invention has been described with respect to specific embodiments, thereof, these embodiments are merely illustrative, and not restrictive of the invention. For example, any type of processing units, functional circuitry or collection of one or more units and/or resources such as memories, I/O elements, etc., can be included in a node. A node can be a simple register, or more complex, such as a digital signal processing system. Other types of networks or interconnection schemes than those described herein can be employed. It is possible that features or aspects of the present invention can be achieved in systems other than an adaptable system, such as described herein with respect to a preferred embodiment.

We claim:

1. A programmable computing device comprising:
a memory storing thread-domain code containing multiple threads, each thread including one or more stream-access operations, at least one operation of each thread including a task; and
a plurality of processing cores coupled to each other and the memory, wherein each of the threads is executed on one of the plurality of processing cores, wherein the task is one of a plurality of tasks associated with the thread-domain code, wherein the task is assigned to one of the processing cores, the task implementing an instance of the thread-domain code executed by the processing core, the computing device further comprising a task manager local to the assigned processing core managing the execution of the task assigned to the processing core;
wherein each stream-access operation:
specifies a programmer-declared output stream,
specifies a programmer-declared variable, and
causes a single current value of the programmer-declared variable to be inserted into the output stream; and
wherein an input stream of at least one other thread executed by one of the processing cores includes the single current values of at least two output streams of the stream-access operations of at least two threads; and
wherein, for each task of the plurality of tasks, the task manager maintains a consumer count for the input stream of a corresponding task reflecting the number of task input streams that are enabled, a producer count for an output stream of the corresponding task reflecting the number of task output streams that are enabled, an input count for the corresponding task that determines the number of task input streams that are required to be enabled in order for the corresponding task to be ready to run, an output count for the corresponding task that determines the number of task output streams that are required to be enabled in order for the corresponding task to be ready to run, and a ready to run queue of tasks ready to be executed based on comparing the consumer count with the input count and comparing the producer count with the output count for each corresponding task.

2. The computing device of claim 1, wherein each operation specifies a programmer-declared input stream and causes a single value to be inserted in the input stream.

3. The computing device of claim 2, further comprising an input-stream FIFO queue associated with each operation, wherein the stream-access operation is blocked if an input-stream FIFO queue is empty, and remains blocked until the FIFO queue becomes non-empty.

4. The computing device of claim 2, wherein the task consumes the single value from the input stream.

5. The computing device of claim 2, wherein the input stream is part of a stream expression that includes the associated programmer-declared output stream, the stream expression to cause the single value to be consumed from the input stream and the data value to be produced in the output stream of the stream expression.

6. The computing device of claim 5, wherein the stream expression includes a call to a function, the stream expression causing the function to be called with the single value retrieved from the input stream and the result returned by the function call is placed into the output stream associated with the function call.

7. The computing device of claim 1, wherein the thread-domain code retrieves the single value from the input stream and places a computed data value into a second stream.

8. The computing device of claim 1, wherein the task manager is implemented in one or more instructions stored on a non-transitory medium that may be executed by a processing core, hardware, or reconfigurable hardware.

9. A method for executing thread-domain code through multiple threads, each thread including one or more stream-access operations on a system including a plurality of processing cores coupled to each other and a memory, at least one of the operations including a task, the method comprising:
   storing the thread-domain code in the memory;
   executing each of the threads is executed on one of the plurality of processing cores, wherein the task is one of a plurality of tasks associated with the thread-domain code; and wherein each stream-access operation specifies a programmer-declared output stream, and specifies a programmer-declared variable;
   assigning the task to a processing core, and wherein the task is one of a plurality of tasks associated with the thread-domain code, the task implementing an instance of the thread-domain code executed by the processing core;
   managing the executing of the task assigned to the processing core via a task manager local to the assigned processing core;
   via the task manager, for each task of the plurality of tasks, maintaining a consumer count for the input stream of a corresponding task reflecting the number of task input streams that are enabled, a producer count for an output stream of the corresponding task reflecting the number of task output streams that are enabled, an input count for the corresponding task that determines the number of task input streams that are required to be enabled in order for the corresponding task to be ready to run, an output count for the corresponding task that determines the number of task output streams that are required to be enabled in order for the corresponding task to be ready to run, and a ready to run queue of tasks ready to be executed based on comparing the consumer count with the input count; and
   comparing the producer count with the output count for each corresponding task via the task manager
   executing each stream-access operation to cause a single current value of the programmer-declared variable to be inserted into the output stream; and
   another thread executed by one of the processing cores includes an input stream that includes the single current values of at least two output streams of the stream-access operations of at least two threads.

10. The method of claim 9, wherein each stream-access operation specifies a programmer-declared input stream and causes a single value to be inserted in the input stream.

11. The method of claim 10, further comprising blocking the stream-access operation if an input-stream FIFO queue is empty, and remains blocked until the FIFO queue becomes non-empty.

12. The method of claim 10, wherein the task consumes the single value from the input stream.

13. The method of claim 10, wherein the input stream is part of a stream expression that includes the associated programmer-declared output stream, the stream expression to cause the single value to be consumed from the input stream and the data value to be produced in the output stream of the stream expression.

14. The method of claim 13, wherein the stream expression includes a call to a function, the stream expression causing the function to be called with the single value retrieved from the input stream and the result returned by the function call is placed into the output stream associated with the function call.

15. The method of claim 9, further comprising retrieving the single value from the input stream and placing a computed data value into a second stream.

* * * * *